United States Patent
Rosberg

(10) Patent No.: US 7,729,347 B2
(45) Date of Patent: Jun. 1, 2010

(54) METHOD AND APPARATUS FOR FAIR FLOW CONTROL AND CONGESTION AVOIDANCE SUPPORTING MULTIPLE QOS CLASS REQUIREMENTS

(75) Inventor: Zvi Rosberg, Frank Peleg, 7, Haifa, 34987 (IL)

(73) Assignee: Zvi Rosberg, Haifa (IL)

( * ) Notice: Subject to any disclaimer, the term of this patent is extended or adjusted under 35 U.S.C. 154(b) by 518 days.

(21) Appl. No.: 11/608,834

(22) Filed: Dec. 10, 2006

(65) Prior Publication Data

US 2007/0280245 A1 Dec. 6, 2007

Related U.S. Application Data

(60) Provisional application No. 60/809,333, filed on May 31, 2006.

(51) Int. Cl.
*H04L 12/28* (2006.01)
(52) U.S. Cl. ..................................... 370/389
(58) Field of Classification Search .................. None
See application file for complete search history.

(56) References Cited

U.S. PATENT DOCUMENTS

| | | | |
|---|---|---|---|
| 5,734,825 A * | 3/1998 | Lauck et al. ................. | 709/233 |
| 5,966,381 A * | 10/1999 | Buckley et al. .......... | 370/236.1 |
| 5,991,268 A * | 11/1999 | Awdeh et al. ............ | 370/236.1 |
| 6,185,187 B1 | 2/2001 | Ghanwani et al. | |
| 6,324,165 B1 | 11/2001 | Fan et al. | |
| 6,615,271 B1 | 9/2003 | Lauck et al. | |
| 6,766,387 B2 | 7/2004 | Sano | |
| 6,769,043 B1 | 7/2004 | Fedorkow et al. | |
| 7,061,861 B1 | 6/2006 | Mekkittikul et al. | |
| 7,123,622 B2 | 10/2006 | Bass et al. | |
| 2005/0018617 A1 | 1/2005 | Jin et al. | |
| 2006/0050640 A1 | 3/2006 | Jin et al. | |
| 2006/0146708 A1 * | 7/2006 | Kanazawa ................. | 709/238 |

OTHER PUBLICATIONS

D. Bertsekas and R. Gallager, Data Networks, Englewood Cliffs, NJ: Prentice-Hall, 1992.
D. Clark and W. Fang, "Explicit allocation of best effort packet delivery service," IEEE/ACM Trans. on networking, vol. 6, No. 4, pp. 362-373, Aug. 1998.
S. Floyd and V. Jacobson, "Random Early Detection gateways for congestion avoidance," IEEE/ACM Trans. on Networking, vol. 1, No. 4, pp. 397-413 Aug. 1993.

(Continued)

*Primary Examiner*—Pankaj Kumar
*Assistant Examiner*—Gautam Sharma

(57) ABSTRACT

For communication networks comprising user devices, edge routers, core routers, access and core links, a specification is given for a novel method and apparatus computing and allocating fair transmission rates to user data flows from a plurality of quality of service levels. The fair rates satisfy the minimum transmission rates, the end-to-end delays and the data loss rates required by each flow and also avoid network congestion. The method comprises: an edge router process and a flow control shaper for each edge router and a core router process for each edge and core router. All processes are executed in a distributed and asynchronous manner, are stable and converge to the desired fair rates. Each flow shaper process shapes the transmission rates based on local measurements driving them to the desired fair rates. The processes are efficient and lend themselves into ASIC and network processor unit implementations.

7 Claims, 9 Drawing Sheets

OTHER PUBLICATIONS

K. Kar, S. Sarkar and L. Tassiulas, "A Scalable Low-Overhead Rate Control Algorithm for Multirate Multicast Sessions," IEEE JSAC, vol. 20, No. 8, pp. 1541-1557, Oct. 2002.

F. Kelly, A. Maulloo and D. Tan, "Rate control for communication networks: Shadow price proportional fairness and stability," J. Oper. Res. Soc., vol. 49, No. 3, pp. 237-252, 1998.

S. Kunniyur and R. Srikant, "End-to-End Congestion Control Schemes: Utility Functions, Random Losses and ECN Marks," IEEE/ACM Trans. on networking, vol. 11, No. 5, pp. 689-702, Oct. 2003.

C. Lagoa, H. Che and B. A. Movsichoff, "Adaptive Control Algorithms for Decentralized Optimal Traffic Engineering in the Internet," IEEE/ACM Trans. on networking, vol. 12, No. 3, pp. 415-428, Jun. 2004.

S. H. Low and D. E. Lapsley, "Optimization flow control, I: Basic algorithm and convergence," IEEE/ACM Trans. on Networking, vol. 7, No. 8, pp. 861-875, Dec. 1999.

S. H. Low, "A Duality Model of TCP and Queue Management Algorithms," IEEE/ACM Trans.on Networking, vol. 11, No. 4, pp. 525-536, Aug. 2003.

L. Massouli and J. Roberts, "Bandwidth Sharing: Objectives and Algorithms,"IEEE/ACM Trans. on Networking, vol. 10, No. 3, pp. 320-328, Jun. 2002.

V. Misra, W. Gong and D. Towsley, "Fluid-based Analysis of a Network of AQM Routers Supporting TCP Flows with an Application to RED," The Proceeding of SIGCOMM'00, pp. 151-160, 2000, Stockholm, Sweden.

Mo and J. Walrand, "Fair End-to-End Window-Based Congestion Control,"IEEE/ACM Trans. on networking, vol. 8, No. 5, pp. 556-567, Oct. 2000.

A. K. Parekh and R. G. Gallager, "A Generalized Processor Sharing Approach to Flow Control in Integrated Services Networks: The Single-Node Case," IEEE/ACM Trans. on Networking, vol. 1, No. 3, pp. 344-357, Jun. 1993.

H. Schulzrinne, A. Rao and R. Lanphier, "Real Time Streaming Protocol (RTSP)," IETF, Network Working Group, RFC 2326, Apr. 1998, USA.

S. Blake, D. Black, M. Carlson, E. Davies, Z. Wang and W. Weiss, "An Architecture for Differentiated Services," IETF, Network Working Group, RFC 2475, Dec. 1998, USA.

J. Wang D. X. Wei and S. H. Low, "Modelling and Stability of Fast TCP," The Proceedings of IEEE INFOCOM 2005, Mar. 2005, Miami, FL, USA (26 pages).

CISCO IOS, Release 12.0. Available at: http://www.cisco.com/univercd/cc/td/doc/product/software/ios120/.

Internet Protocol, IETF, RFC 791, Sep. 1981.

* cited by examiner

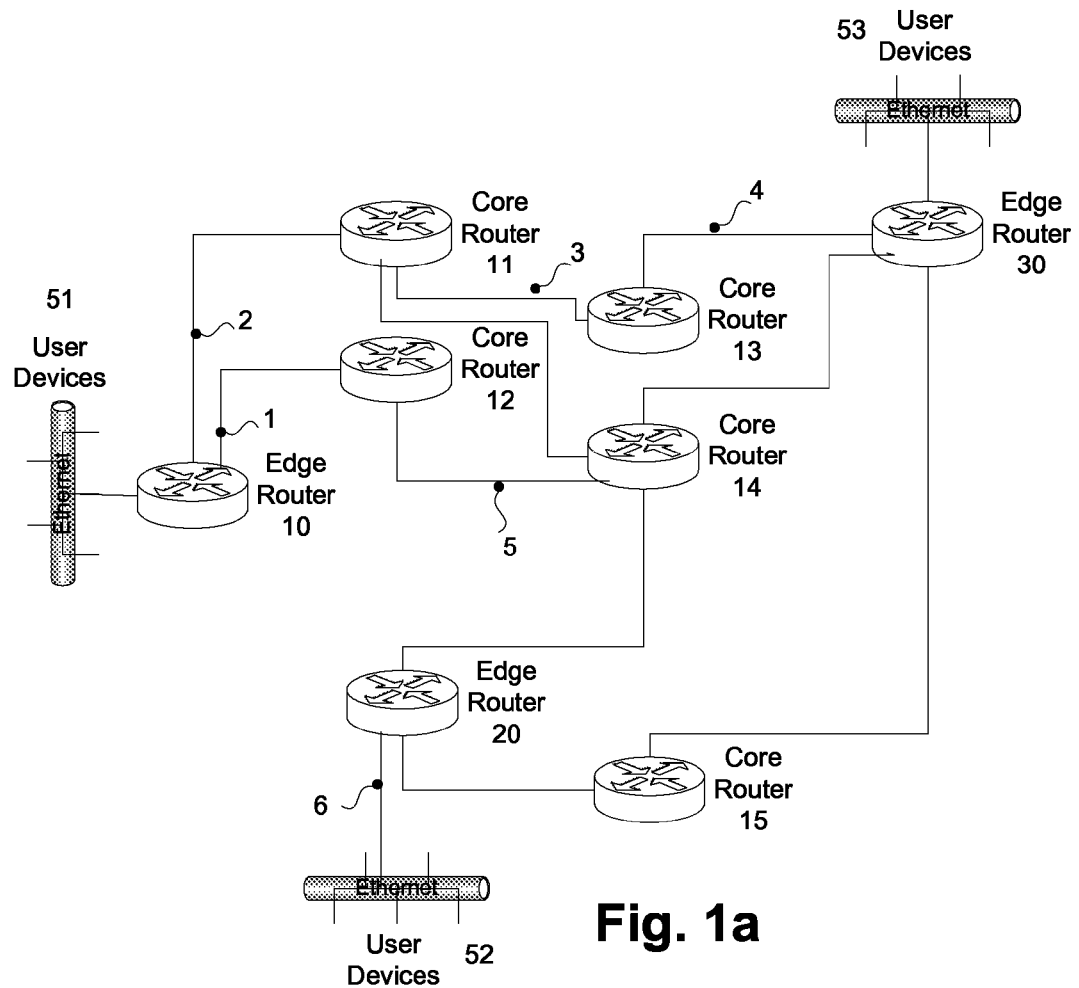
Fig. 1a
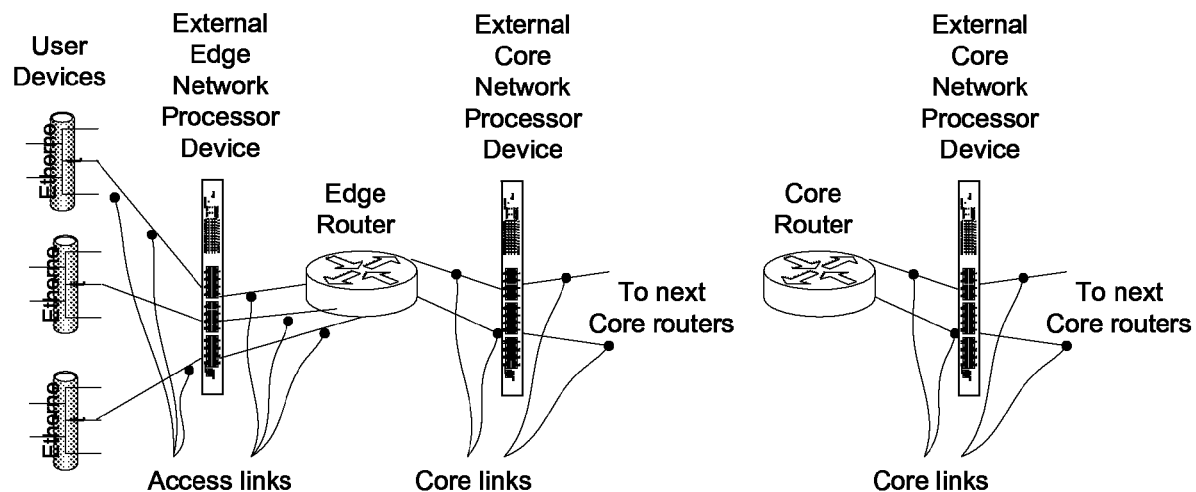
Fig. 1b   Fig. 1c

Edge Constants (E_CON) 200

| FAIR_LEVEL (FL) | → 201 |
| #QOS (Q) | → 202 |
| #WEIGHTS (J) | → 203 |
| RTT_CONST (C) | → 204 |
| LOSS_CONST (CL) | → 204a |
| WIN_CONST (CW) | → 204b |
| WIN_UB | → 204c |

| INIT_RATE | → 205 |
| D_TH1 | → 206 |
| D_TH2 | → 207 |
| L_TH1 | → 206a |
| L_TH2 | → 207a |
| IDLE_TH | → 208 |
| #FLOWS (I) | → 209 |

Edge Timers 240

| RMP_Timer | → 241 |
| RTT_Timer | → 242 |
| RMP_Counter | → 243 |

Edge Active Flow Table 210 (EAF_TAB)

211 ←

| Flow # | QoS | Weight | Rate | R_Diff | RTT | Modified | Window_Size | Loss_R |
|--------|-----|--------|------|--------|-----|----------|-------------|--------|
| • | • | • | • | • | • | • | • | • |
| • | • | • | • | • | • | • | • | • |
| • | • | • | • | • | • | • | • | • |

→ 212, 213, 214, 219, 218, 217, 216, 215

Edge QoS Table (EQ_TAB) 220

221 ←

| QoS | D_Req | R_Req | L_Req | Weight | PRIO |
|-----|-------|-------|-------|--------|------|
| • | • | • | • | • | • |
| • | • | • | • | • | • |
| • | • | • | • | • | • |

→ 222, 226, 225, 224, 223

Edge Flow Table (EF_TAB) 230

| Source_IP | Destination_IP | QoS | Flow # | Out_Port |
|-----------|----------------|-----|--------|----------|
| • | • | • | • | • |
| • | • | • | • | • |
| • | • | • | • | • |

Core Constants 250

- UPD_TIMER_CONST (C1) → 251
- BW_TOL_CONST (C2) → 252
- PENALTY_CONST (C3) → 253
- APPROX_CONST (C4) → 254
- #OUT_PORT_IF (N) → 255
- #PRIO (P) → 256

Core Timers 280

- Update_Timer → 281

Core Rate Table (CR_TAB) 260

| Link # | cap | res | penalties | rates |
|---|---|---|---|---|
| • | • | • | • | • |
| • | • | • | • | • |
| • | • | • | • | • |

→ 261, 262, 265, 264, 263

Core QoS BW Tolerance Table 270 CBWT_TAB

| PRIO | bw_util |
|---|---|
| • | • |
| • | • |
| • | • |

→ 271, 272

METHOD AND APPARATUS FOR FAIR FLOW CONTROL AND CONGESTION AVOIDANCE SUPPORTING MULTIPLE QOS CLASS REQUIREMENTS

CROSS-REFERENCE TO RELATED APPLICATION(S)

The present application claims the benefit of U.S. Provisional Application No. 60/809,333 filed May 31, 2006, which is herein incorporated by reference.

BACKGROUND OF THE INVENTION

1. Field of Invention

The present invention relates to a method and apparatus for adaptive allocation of fair bandwidth in the links attached to routers of a backbone network comprising edge routers, core routers and links serving a plurality of flows from a plurality of Quality of Service (QoS) classes, so as to meet the end-to-end QoS requirements of each flow, avoid network congestion and utilize the network resources optimally.

2. Description of Prior Art

A backbone (communication) network comprises a plurality of edge and core routers interconnected by a plurality of links facilitating data communication between end user applications running in user computer devices at the user premises. The user devices, which comprise the end sources and the end destinations of the data traversing the backbone network, are connected to the edge routers by access links. The edge routers, which are connected to the user devices on one end, are also connected to core routers by core links on the other end. The core routers, however, are connected by core links only to other routers (either core or edge routers). Some enterprise backbone networks, e.g., Intranets, and public backbone networks, e.g., the Internet, comprise multiple network domains, where each network domain could utilize a different switching and routing protocol such as Internet Protocol (briefly IP), Frame Relay (briefly FR), Asynchronous Transfer Mode (briefly ATM), Multi-Protocol Label Switching (briefly MPLS) and Generalized Multi-Protocol Label Switching (briefly GMPLS). Since almost all user end applications communicate by IP, almost all edge routers support IP routing and switching.

Most user applications utilize Transport Control Protocol (briefly TCP) and User Datagram Protocol (briefly UDP) communication sockets, both generating IP packets. IP packets could be further encapsulated into network transmission units (briefly NTU) being transported through particular transport networks such as FR, ATM, MPLS and GMPLS. Efficient operation of a network requires tight control of the data flowing throughout the network. A data flow (briefly a flow) comprises all IP packets with the same QoS class flowing from a common source node, alternatively network number, to another common destination node, alternatively network number, along the same route. In accordance with IETF RFC 791, both, the source and the destination IP addresses, which also contain the respective network numbers, as well as the QoS class, are specified in the IP packet header. The QoS class is marked in the TOS header specifying performance requirements, e.g., minimum transmission rate, end-to-end packet delay and packet loss rate.

Flow control is the method of allocating the bandwidth of the network links between the flows and shaping the flow transmission rates accordingly. Flow control in a network is implemented by one or more distributed asynchronous and adaptive algorithms that are designed to meet some performance measures and to avoid network congestion. It is further desired from a flow control method to fully utilize the link bandwidths and to share the bandwidths between the flows in a fair manner as specified in reference [J. MO AND J. WALRAND, 2000]. Generally, fairness is subjective and several definitions exist. Therefore, it is of utmost importance to have a flow control method that can handle a wide range of fairness definitions. Although prior art provide a plurality of flow control methods, none of which handle multiple QoS classes in a manner that guarantee end-to-end QoS requirements for all flows, neither can they achieve fair bandwidth allocation between all flows and all QoS classes. The method of the present invention handles multiple QoS classes, guarantees end-to-end QoS requirement for every flow in any QoS class as well as allocates rates fairly in accordance to any given fairness definition within a wide range fairness notions.

Network flow controls could be practiced in several protocol layers such as the OSI network layer (e.g., IP layer), the OSI transport layer (e.g., TCP, ATM, MPLS and GMPLS). Also, the control processes could be executed in network processor devices (routers and switches) and/or in end user computer devices. A significant design consideration for flow control is to select the OSI layer. Prior art fair flow controls that are executed in network processor devices and handle a plurality of QoS classes, are applicable only in Virtual Circuit (VC) switched networks such as ATM (see U.S. Pat. Nos. 5,734,825; 5,966,381; 5,991,268; 6,185,187; 6,615,271; 6,324,165; 6,766,387; and 6,769,043). One embodiment of the method of the present invention that is executed in network processor devices controls the flows at the IP packet level rather than at the ATM cell level. It is also applicable to almost any transport network for the reasons explained herein. The generic format of the data traversing the network is dictated by the Application Program Interface (API) utilized in the user devices for networking applications. The two dominant APIs, which are not likely to change in the foreseeing future, are TCP and UDP sockets, both injecting IP data packets into the networks. Although IP packets could be encapsulated further into FR, ATM, MPLS or GMPLS NTUs, controlling the flows at the IP packet level is more general than controlling those at the NTU level since NTU format could change along the various network domains. Such a variety of domains would require a complex combination of flow control types, rather than a single generic one at the IP packet level. The latter is particular important for the Internet network and for multiple-domain enterprise networks.

Another significant design consideration is the scope of the flow control method. Some prior art fair flow controls that are executed in network processor devices and handle a plurality of QoS classes are limited to specific network topologies such as a metropolitan ring or a single switch (see U.S. Pat. Nos. 7,061,861 and 7,123,622). Some other prior art flow controls are limited to a single notion of fairness, known as max–min fairness (specified in reference [D. BERTSEKAS AND R. GALLAGER, 1992]), or a weighted variant of max–min fairness. The method of the present invention is applicable to any network topology and to a wide range of fairness notions including max–min fairness and proportional fairness as proposed in references [F. KELLY, A. MAULLOO AND D. TAN, 1998] and [J. MO AND J. WALRAND, 2000]. Hereinafter, the extended fairness notion is referred to as extended proportional fairness, or briefly fairness.

Whereas practical QoS requirements refer to end-to-end performance requirements, some prior art flow control guarantee only per-hop performance behavior (see reference [CISCO IOS, Release 12.0.] and the Differentiated Services QoS architecture, aka DiffServ [S. BLAKE, D. BLACK, M.

CARLSON, E. DAVIES, Z. WANG AND W. WEISS, 1998]). Furthermore, each network processor router/switch requires manual configuration which should be coordinated across multiple network administrative domains and rely on a network provisioning tool. Another prior art method, the Integrated Services QoS architecture, aka IntServ, does guarantee end-to-end performance behavior but scarifies the scalability of the solution, hence applicable only for small networks. The method of the present invention is scalable, as DiffServ, and at the same time it also guarantees end-to-end performance, as IntServ. Furthermore, it adapts itself to the network traffic requiring only very simple configuration in the edge routers.

Some prior art network flow controls are executed in the end user devices rather than in the network processor devices. TCP flow control is the most common one and streaming application flow controls are others. Unlike the flow controls executed in ATM switches which adjust the transmission rates directly (known as rate-based flow control), prior art TCP flow controls are window-based methods which adjust the number of outstanding bytes that a flow can transmit, i.e., the window size. Prior art TCP window flow control are driven by the measurements of packet round trip times (briefly RTT); the resulting transmission rates and RTTs are implied and cannot be determined from the outset. Therefore, prior art TCP flow control suits only best-effort traffic flows. One embodiment of the method of the present invention also utilizes window-based flow control; however, it can also achieve pre-specified transmission rates and RTTs as required in the outset by the QoS classes. Prior art flow controls for streaming applications are rate-based and utilize the local network configuration of the user device to determine each rate target; these rates are not necessarily achievable.

In the quest for improving flow control, prior art research studies have studied the stability and the convergence of various flow control methods that can achieve fairness for a single flow QoS class known as the best effort class (see references [K. KAR, S. SARKAR AND L. TASSIULAS, 2002] [F. KELLY, A. MAULLOO AND D. TAN, 1998] [S. KUNNIYUR AND R. SRIKANT, 2003] [C. LAGOA, H. CHE AND B. A. MOVSICHOFF, 2004] [S. H. LOW AND D. E. LAPSLEY, 1999] [S. H. LOW, 2003] [L. MASSOULI AND J. ROBERTS, 2002] [J. MO AND J. WALRAND, 2000] [J. WANG D. X. WEI AND S. H. LOW, 2005]). These studies have inspired new fairness notions and have lead to better understanding of the stability issues involved in flow control. They have further contributed new rate-based and window-based flow controls that manifest fairness for best effort flows. Prior art rate-based fair flow controls are specified in references [K. KAR, S. SARKAR AND L. TASSIULAS, 2002] [F. KELLY, A. MAULLOO AND D. TAN, 1998] [S. KUNNIYUR AND R. SRIKANT, 2003] [C. LAGOA, H. CHE AND B. A. MOVSICHOFF, 2004] [S. H. LOW AND D. E. LAPSLEY, 1999] [L. MASSOULI AND J. ROBERTS, 2002] and U.S. Pat. Nos. 5,734,825; 5,966,381; 5,991,268; 6,185,187; 6,615,271; 6,324,165; 6,766,387; and 6,769,043. Prior art window-based fair flow controls are specified in references [J. MO AND J. WALRAND, 2000] D. WANG D. X. WEI AND S. H. LOW, and US patent applications 20050018617 and 20060050640. This prior art specifications are not addressing fair flow control for multiple flow QoS classes. Both embodiments of the method of the present invention, the window-based and the rate-based flow controls, do address extended proportional fairness for multiple flow QoS classes.

One shortcoming of prior art TCP flow control is that fairness, which is manifested in the case of single flow QoS class, breaks in the presence of non-conforming flows such as streaming application, e.g. RTSP, reference [H. SCHULZRINNE, A. RAO AND R. LANPHIER, and MMS (Microsoft media services]. Another shortcoming is that network congestion can emerge unless another protocol, known as congestion avoidance and implemented by an active queue management (AQM) module, is utilized (see references [D. CLARK AND W. FANG, 1998] [S. FLOYD AND V. JACOBSON, 1993] [V. MISRA, W. GONG AND D. TOWSLEY, 200] [Ref 19]). Currently, congestion avoidance is utilized by TCP but not by most of the streaming applications. Both shortcomings are addressed by the method of the present invention.

A common prior art rate-based traffic shaper, which is implemented in most current routers, is known as token bucket (see reference [A. K. PAREKH AND R. G. GALLAGER, 1993]). Token bucket is also utilized by one embodiment of the method of the present invention.

BRIEF SUMMARY OF THE INVENTION

In a backbone network comprising at least two edge routers, none or a plurality of core routers and at least one link, three explicit process types along with their data structures are disclosed by this invention. Each process type is executed in a core router and/or in an edge router; alternatively, in an external network processor device attached to the respective router. Each attachment is done in a manner by which the external network processor device can intercept the IP packets from the links, process them and then return them to same links. The processes are efficient and comprise a method and apparatus for computing and shaping the rates of multiple QoS class flows subject to the QoS requirements of each flow. The processes are executed in a distributed and asynchronous manner, converge rapidly to the fair transmission rates and prevent network congestion. One process type, referred to as the edge router process, is executed in each edge router, alternatively in an external network processor device attached to its access links connected to the user devices. Another process type, referred to as the core router process, is executed in each core and edge router, alternatively in an external network processor device attached to its core links connected to other core routers. All edge and core router processes collectively and harmonically compute iteratively the required fair transmission rates as a function of the most current network traffic. The third process type, referred to as the flow shaper process, which is executed in each edge router, shapes the actual transmission rate of each flow so as to meet the desired rates computed by the ensemble of the edge and the core router processes.

Periodically, each origin edge router process generates a designated IP packet for each local active flow, referred to as a Resource Management Protocol (RMP) forward packet, and transmits it to the edge router process at the other end of the flow route, referred to as the destination edge router. The destination edge router process marks the RMP forward packet as a backward RMP packet and transmits it back to the origin edge router. An edge router process evolves as a state machine utilizing its local data structure to determine its next state. The process state is updated every time an RMP packet returns as a backward RMP packet, or when a new data packet arrives from a source user device connected to the edge router. Each backward RMP packet delivers feedback information placed by the core router processes traversed by it as a forward RMP packet. The feedback information is utilized by the source edge router process to update the packet round trip time, the packet loss rate and the target transmission rate of the respective flow. When a new data packet arrives from source user device, the source edge router process classifies it into an active flow and updates the state of the active flows.

A core router process also evolves as a state machine utilizing its local data structure to determine its next state. Every time an RMP forward packet traverses through a core router process, it updates its total flow rate by the transmission rate difference carried by the RMP packet and increments a designated penalty field in the RMP packet by its local current penalty value. The RMP packet may also carry an instruction to update the parameters utilized by the core router process for computing its local penalty value.

Two embodiments are given for the flow shaper process. One is a token bucket control with adaptive token rate, which transmits the packets of each active flow in the source edge device executing the edge router process according to a token bucket mechanism, where the bucket is filled with tokens at a varying fair rate computed by the edge router process. The other embodiment is an RTT-based window flow control, which transmits the packets of each active flow according to a window flow control, where the window size of each active flow varies in time and is computed by the edge router process.

Each process is efficient and lends itself easily into ASIC based and Network Process Unit (NPU) based implementations.

BRIEF DESCRIPTION OF THE DRAWING

Having thus set forth some of the drawbacks and limitations of the prior art and some objectives and advantages of the present invention, other objectives, processes, features and advantages of the present invention will be apparent to one skilled in the art from the following detailed description in which:

FIG. 1a is a simplified block diagram of a communication network comprising user devices, edge routers, core routers and links where the method and apparatus of the present invention is implemented.

FIG. 1b is a simplified block diagram illustrating the attachments of the external network processor devices to an edge router in the case where the edge and the core router processes of the present invention are implemented in external devices.

FIG. 1c is a simplified block diagram illustrating the attachments of an external network processor device to a core router in the case where the core router processes of the present invention is implemented in an external device.

FIG. 2a is a simplified block diagram of one embodiment of elements utilized in the edge router process for implementing the processes of the present invention.

DETAILED DESCRIPTION

Figure 2B:
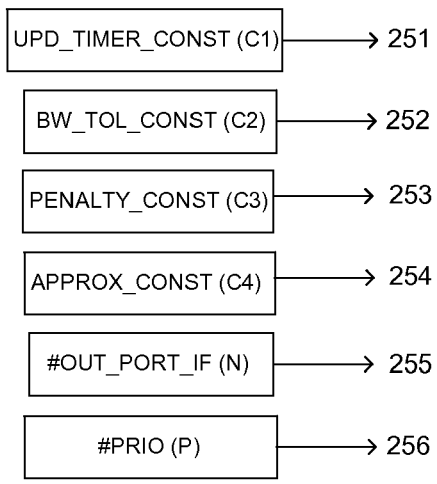
FIG. 2b is a simplified block diagram of one embodiment of elements utilized in the core router process for implementing the processes of the present invention.

A simplified block diagram of an exemplary communication network is shown in FIG. 1a. The network comprises a plurality of edge routers, e.g., 10, 20, 30, and core routers, e.g., 11, 12, 13, 14, 15, interconnected by a plurality of links. For example, link 1 connects edge router 10 and core router 12; and link 3 connects core router 11 and core router 13. Each link may represent either a single hop physical link or a logical link comprising multiple hops defined in an underlying transport network such as FR, ATM, MPLS and GMPLS. Such logical links appear to the IP network layer as a single hop link. Furthermore, different subsets of routers and links may belong to different administrative domains, e.g., ISPs, Telecom companies. Hereinafter, such general communication network comprising core routers, edge routers and connecting links is referred to in the present invention as a backbone network. User devices, e.g., 51, 52, 53, which are the end sources and end destinations of the data traversing the backbone network, are connected by access links through the edge routers located at the edge of the network. Edge routers, which are connected to user devices on one end, are also connected to core routers by core links on the other end. Core routers are connected only by core links to other routers (either core or edge routers).

A router (edge and core) in this invention is a network device that can switch Internet Protocol (IP) packets from input link interfaces to output link interfaces based on the IP packet header fields and its local IP routing table. By selecting the proper output links, a particular path is obtained between a source edge router, e.g., 10 in FIG. 1a, and a destination edge router, e.g., 30 in FIG. 1a. The ordered sequence of links, routers and their associated resources utilized by IP packets from a particular source edge router to a particular destination edge router is referred to as a route. For example, one route shown in FIG. 1a between edge router 10 and edge router 30 comprises links 2, 3, and 4 and core routers 11 and 13. Attributed to the dynamic nature of IP packet routing algorithms, e.g., OSPF, the route of a specific flow can vary in time moderately so as to adapt itself to temporary network congestions.

Exemplary routers include those manufactured by Cisco Systems Inc. (e.g., routers from series 700, 800, 100x, 1600, 1700, 1800, 2500, 2600, 2800, 3600, 3700, 3800, 4500, 4700, 7000, 7200, 7400, 7500, 7600, 10000, 12000, CRS-1); and by Juniper Networks (e.g., routers from T-series, M-series, E-series, and J-series families). Exemplary edge routers include those manufactured by Juniper Networks (e.g., M-series and E-series routers); and by Cisco System Inc. (e.g., the 10000-series). Exemplary core routers include those manufactured by Juniper Networks (e.g., the T-series routers); and by Cisco System Inc. (e.g., the 7000-series).

In accordance with the IP protocol, e.g., IETF RFC 791 (see reference [INTERNET PROTOCOL, IETF, RFC 791, September 1981]), each IP packet contains a type of service (TOS) field in its header which is utilized by various protocols to mark its QoS level. Hereinafter, the collection of all IP packets traversing through a particular route from one particular source IP address, alternatively source network number, to another particular destination IP address, alternatively destination network number, having the same value in their TOS field of their header is referred to in the present invention as a flow. A particular flow may comprise IP packets originating from a plurality of user devices connected to the same source edge router. Having thus set forth, one embodiment of the flow control of the present invention, which is implemented in the routers or in their attached network processor devices (illustrated in Figures FIG. 1b and FIG. 1c) handles traffic aggregated from a plurality of end user applications.

In the present invention, a flow associated with a particular QoS level typically requires a maximum end-to-end packet delay, a minimum transmission rate and a maximum packet loss rate. The typical default QoS level, aka best effort, is one that set no service requirements. Each link in the backbone network can be utilized by a plurality of IP packets associated with a plurality of flows traversing through a plurality of routes comprising that link. However, each link has a prespecified bandwidth which limits the transmission rate of the flows traversing through that link.

In the system of the present invention, the edge and the core routers jointly and distributively determine the current fair transmission rates (in accordance with the definition in publication [J. MO AND J. WALRAND, 2000]) for all active flows subject to their QoS requirements. These fair rates are utilized for shaping the transmission of IP packets in all edge routers. Mechanisms that shape the transmission of IP packets comprising each flow in accordance with the required fair rates are specified hereinafter in the present invention.

As described hereinafter, IP packets arriving at each edge router process from the user devices connected to it by an access link, e.g., 6 in FIG. 1a, are classified by the method of the present invention into active flows. Furthermore, their transmission on the output links of the edge router is also controlled by the method of the present invention. A portion of the contents of exemplary tables, parameter and timers utilized by one edge router process of the present invention to classify IP packets into flows, maintain the information about active flows and to exchange information with the core router processes are given in FIG. 2a. As is readily apparent to one skilled in the art, the tables, constants and timers utilized are not limited to the embodiment disclosed herein and can include more information than that shown. The method of the present invention differentiates between two types of flows. A flow of Type I has a QoS level requiring a minimum transmission rate and a flow of Type II has a QoS level without a minimum transmission rate. A flow of IP data packets from Type I corresponds to a specific end user application or set of applications accessing the backbone network through a common edge router and transmitting packets with the same values in the following IP header fields: source IP address, destination IP address and TOS. Type I flows are not aggregated in the edge routers and their QoS requirements are controlled individually. A flow of IP data packets from Type II is an aggregation of end user applications accessing the backbone network through a common edge router and transmitting IP packets having the same source network number, destination network number and TOS value in the source IP address, destination IP address and TOS header fields, respectively.

Referring to FIG. 2a, Table EAF_TAB 210 maintains the information regarding each active flow. Flow# column 211 contains active flow identifications. QoS column 212 contains active flow QoS levels as specified in column QoS 221 of Table 220 in FIG. 2a. Weight column 213 contains positive numbers, each specifying the importance of the respective active flow in accordance with the fairness notion used by the present invention. For example, if two active flows, i and j, have Weights w(i)>w(j) and both are traversing the same route and have the same QoS level, then the method of the present invention will assign to flow i a rate larger than the one assigned to flow j. Rate column 214 contains variables holding the current rates assigned to the active flows by the method of the present invention. In the present invention, a flow rate can be measured in one out of a plurality of scales, e.g., the average number of bytes that have been transmitted per second during the time that the flow has been active, the average number of bytes that have been transmitted per second during the last t seconds of the active flow, where t is a given positive real number. The variables in Rate column 214 are utilized by the method of the present invention to shape the actual transmission rates of the flows in the edge router process. R_Diff column 215 contains variables holding the difference between the current Rate 214 of a flow and the Rate used at the previous update time of that flow. The data in this column is utilized for informing the core router processes along each flow route the difference in its transmission rate. Column RTT 216 contains variables holding the estimated round trip times (RTT) of IP packets from the respective active flows. An example of RTT is 0.200 seconds reflecting an estimated time that it would take for an IP packet to traverse from the source edge router, e.g., 10 in FIG. 1a, to its destination edge router, e.g., 30 in FIG. 1a, and back. The data in column RTT is utilized in the edge router process to trigger updates in the data structures of the core router processes along the flow routes and to shape the actual transmission rates of the flows in one embodiment of the method of the present invention. Modified column 217 contains variables holding the last times when IP packets from the respective flow have been transmitted. This column is utilized to maintain a current list of active flows. Window_Size column 218 contains variables, one for each active flow, specifying the current maximum window size in bytes or packets for that flow. This column is utilized by one embodiment of the method of the present invention to shape the actual transmission rate of each active flow. Column Loss_R 219 contains variables holding the estimated loss rate of IP packets from the respective active flows. As with RTT 216, the variables in Loss_R column 219 are also utilized by the method of the present invention to trigger updates in the data structures of the core router processes along the flow routes.

Referring further to FIG. 2a, Table EQ_TAB 220 maintains configurable information regarding the QoS levels supported by the backbone network. Column QoS 221 contains the identification of the QoS levels also utilized by Table 210 in FIG. 2a. Column D_Req 222 contains the maximum packet delay i.e., packet RTT, required by the corresponding QoS level. D_Req 222 takes values from a predefined finite set. Column R_Req 223 contains the minimum transmission rate required by the corresponding QoS level. R_Req 223 takes values from a predefined finite set containing also a symbol for no minimum rate requirement. Column L_Req 224 contains the maximum packet loss rate required by the corresponding QoS level. L_Req 224 takes values from predefined finite set. Column Weight 225 contains positive numbers utilized by the method of the present invention to differentiate between flows within the same QoS level. Column PRIO 226 contains the switching priority (aka scheduling priority) of the IP packets having the corresponding QoS level. Switching priorities are correlated negatively with the values in D_Req 222. That is, if D_Req(i)<D_Req(j), then the packets from a flow i would have the same or higher switching priority than the packets from flow j. PRIO 226 takes values from a predefined finite set.

Referring further to FIG. 2a, Table EF_TAB 230 in FIG. 2a maintains configurable information utilized by the method of the present invention to identify and classify flows. For flows of Type I, each cell in column Source_IP 231 contains the source IP address matching the IP address in the source address header field of the flow packets. For flows of Type II, each cell in column Source_IP 231 contains the IP address of a representative source device in the network number matching the network number in the source address header field of the flow packets. That is, the source address header fields of all IP packets from a given Type II flow contain the same network number. In accordance with IETF RFC 791, each IP data packet arriving at the edge router from a user device connected to it contains an IP address in the source address field of its header from which column Source_IP 231 can be extracted. For flows of Type I, each cell in column Destination_IP 232 contains the destination IP address matching the IP address in the destination address header field of the flow packets. For flows of Type II, each cell in column Destination_IP 232 contains the IP address of a representative destination device in the network number matching the network number in the destination address header field of the flow packets. That is, the destination address header fields of all IP packets from a given Type II flow have the same network number. In accordance with IETF RFC 791, each IP data packet arriving at the edge router from a user device connected to it contains an IP address in the destination address field of its header from which column Destination_IP 232 can be extracted. Column QoS 233 contains the flow QoS levels also utilized by Tables 210 and 220 in FIG. 2a. In accordance with IETF RFC 791, each IP data packet arriving to the edge router from a user device connected to it contains a TOS field in its header utilized for marking its QoS level. If the backbone network does not support a plurality of QoS levels, the only value in column QoS 233 would be the default value for best effort service. The TOS header field is used by IETF RFC 791 to specify IP service levels. The QoS notion, however, has a wider scope than the IP TOS and the latter can be translated into QoS levels which can be utilized by the method of the present invention. In the present invention, the QoS value determines the flow switching priority PRIO 226. In the system of the present invention, each edge router process sets the TOS header fields of the IP packets arriving from attached user devices to some QoS level in accordance to the network operator policy. In one embodiment of the present invention, the TOS header field is set to the PRIO 226 value associated with QoS level. Column Flow# 234 contains the flow identification which is also utilized by Table 210 in FIG. 2a. Each cell in column Out_Port 235 contains the output link identifier through which the packets of the respective flow are switched out from the edge router. The column may also contain a wildcard symbol that matches any symbol. The variables in Source_IP 231, Destination_IP 232, QoS 233 and Out_Port 235 determine a flow uniquely.

Referring further to FIG. 2a, the constants E_CON 200 contain configurable parameters utilized by the edge router process of the present invention to maintain and update the data structures residing in the edge router process. The configurable constant FAIR_LEVEL (FL) 201 is a number greater than or equals one specifying the fairness level utilized by the chosen embodiment of the present invention. A value of one facilitates proportional fair rates as defined in publication [F. KELLY, A. MAULLOO AND D. TAN, F. KELLY, A. MAULLOO AND D. TAN, 1998]. A large value of FL 201, e.g., 1000, facilitates max-min fair rates defined in publications [D. BERTSEKAS AND R. GALLAGER, 1992]. Any value of FL 201 between one and e.g., 1000 facilitates fairness properties somewhere between proportional fairness and max-min fairness. The configurable constant #QOS (Q) 202 is the number of different QoS levels supported by the backbone network. The configurable constant #WEIGHTS (j) 203 is the number of different weights utilized by Tables 210 and 220 in FIG. 2a. The configurable constant RTT_CONST (C) 204 is a number between zero and one utilized by the method of the present invention for estimating the packet RTT. The configurable constant LOSS_CONST (CL) 204a is a number between zero and one utilized by the method of the present invention for estimating the packet loss rate. The configurable constant WIN_CONST (CW) 204b is a number between zero and one utilized by the window flow control method of the present invention to weight the previous window size when computing the next window size. The configurable constant WIN_UB 204c is a positive number utilized by the window flow control method of the present invention for bounding the maximum window size. The configurable constant INIT_RATE 205 is a positive number utilized by the method of the present invention to initialize the transmission rate of a new active flow without a minimum rate requirement. The configurable constants D_TH1 206, L_TH1 206a, D_TH2 207 and L_TH2 207a are positive threshold numbers utilized by the method of the present invention for requesting from the core router processes along that route to update their data structures in a certain manner defined below. Such update requests are triggered when the estimators of the packet RTT or the packet loss rate of particular active flows do not conform to the QoS requirements specified in column D_Req 222 or column L_Req 224 of Table 220, respectively. The configurable constant IDLE_TH 208 is a positive threshold number utilized by the method of the present invention to determine when an active flow is no longer active. The variable #FLOWS (I) 209 holds the current number of active flows.

Referring further to FIG. 2a, the Edge Timers 240 are utilized by the method of the present invention to measure timing and packet loss events in the edge router process. The RMP_Timer 241 triggers the transmission of forward RMP packets (specified hereinafter) from the edge router process. Upon RMP_Timer expiration, one forward RMP packet is transmitted for each active flow to its destination edge router process. An RMP packet has two modes, forward and backward. Forward RMP packets are RMP packets originated periodically by a source edge router process for each active flow. Each forward RMP packet is transmitted to the destination edge router process of the corresponding flow. When the destination edge router process receives the forward RMP packet, the RMP packet is sent back to its originating edge router process as a backward RMP packet. The RTT_Timer 242 is utilized to measure the RTT of each forward RMP packet transmitted by the edge router. The RMP_Counter 243 is utilized to mark the forward RMP packets of each active flow in an increasing order. In the method of the present invention, marking RMP packets in an increasing order is utilized for estimating the packet loss rate of each flow.

As explained above, RMP packets correspond to active flows and are transmitted periodically by each edge router process to the corresponding destination edge router processes. Each RMP packet associated with a particular active flow traverses the core router processes along the flow route as a forward RMP packet carrying update information from the edge router process. After reaching the destined edge router process, it traverses back to its originating edge router process as a backward RMP packet carrying update information from the core outer processes. Besides carrying update information, RMP packets are also utilized as probes for estimating RTT and packet loss rates. A portion of the content of exemplary tables, parameters and timers utilized by the method of the present invention in each core router process to maintain rate information on each output link and to compute feedback information for the edge routers processes are given in FIG. 2b. As is readily apparent to one skilled in the art, the tables, constants and timers utilized are not limited to the embodiment disclosed herein and can include more information than that shown.

Referring to FIG. 2b, Table CR_TAB 260 maintains the information on each output core link. Link# column 261 contains the link identifications. Column cap 262 contains the capacity of the respective links, in bit per second (bps). For each raw n in the table, the element in column res 263 is a vector of positive variables, one for each scheduling priority p, associated with output link n. The p element in the vector holds the total reserved capacity (in bps) of all flows with minimum rate requirements (Type I flows) from all edge routers having scheduling priority p that traverse through output link n. For each raw n of the table, the element in column penalties 264 is also a vector of positive variables, one for each scheduling priority p, associated with output link n. The p element in the vector holds the current feedback information associated with output link n and priority p. For each raw n, the element in column rates 265 is again a vector of positive variables, one for each scheduling priority p, associated with output link n. Each p element in the vector holds the total current transmission rate (in bps) of all flows of Type II from all edge routers with priority level p traversing through output link n.

Referring further to FIG. 2b, Table CBWT_TAB 270 maintains one adaptable variable for each scheduling priority level and output link utilized by the method of the present invention in the core router process for computing the penalties 264 of Table 260 in FIG. 2b so as to achieve the end-to-end requirements for IP packet loss and IP packet delay associated with each QoS class. Column PRIO 271 contains the scheduling priority levels. Each row p of column bw_util 272 contains an adaptable vector of variables, {bw_util(n), n=1, ..., N}, utilized by the method of the present invention to upper bound the output link utilization of packets with priority levels 1, 2, ..., p, i.e., priorities higher than or equals to p. The Update_Timer 281 is utilized by the method of the present invention in the core router process to constrain the update rate of Table 270 triggered by forward RMP packets sent from edge router processes.

Referring further to FIG. 2b, the Core Constants 250 contain configurable parameters utilized by the present invention in the core router process to maintain and update its data structures. The configurable constant UPD_TIMER_CONST (C1) 251 is a positive number utilized in conjunction with Update_Timer 281 to bound below the time between two consecutive updates of Table 270. The configurable constant BW_UTIL_CONST (C2) 252 is a positive number utilized for incrementing or decrementing the variables in column bw_util 272 of Table 270 in FIG. 2b. The configurable constants PENALTY_CONST (C3) 253 and APPROX_CONST (C4) 254 are two positive numbers utilized for computing the values in column penalties 264 of Table 260 in FIG. 2b. The configurable constant #OUT_PORT_IF (N) 255 is the number of core output links in the core router and the configurable constant #PRIO (P) 256 is the number of different priority levels supported by the backbone network.

As explained above, RMP packets are utilized by the method of the present invention for distributing information between the edge router processes and the core router processes. A portion of the content of exemplary fields in an RMP packet utilized by the method of the present invention to communicate information between the edge router processes and the core router processes comprising the backbone network are given in FIG. 3. As is readily apparent to one skilled in the art, the fields utilized are not limited to the embodiment disclosed herein and can include more information than that shown. Furthermore, it is understood by one skilled in the art, that the information carried in these fields can be implemented in a plurality of manners and the present invention disclosed herein is not limited by the specific embodiment of the exemplary fields presented in FIG. 3.

Figure 3:
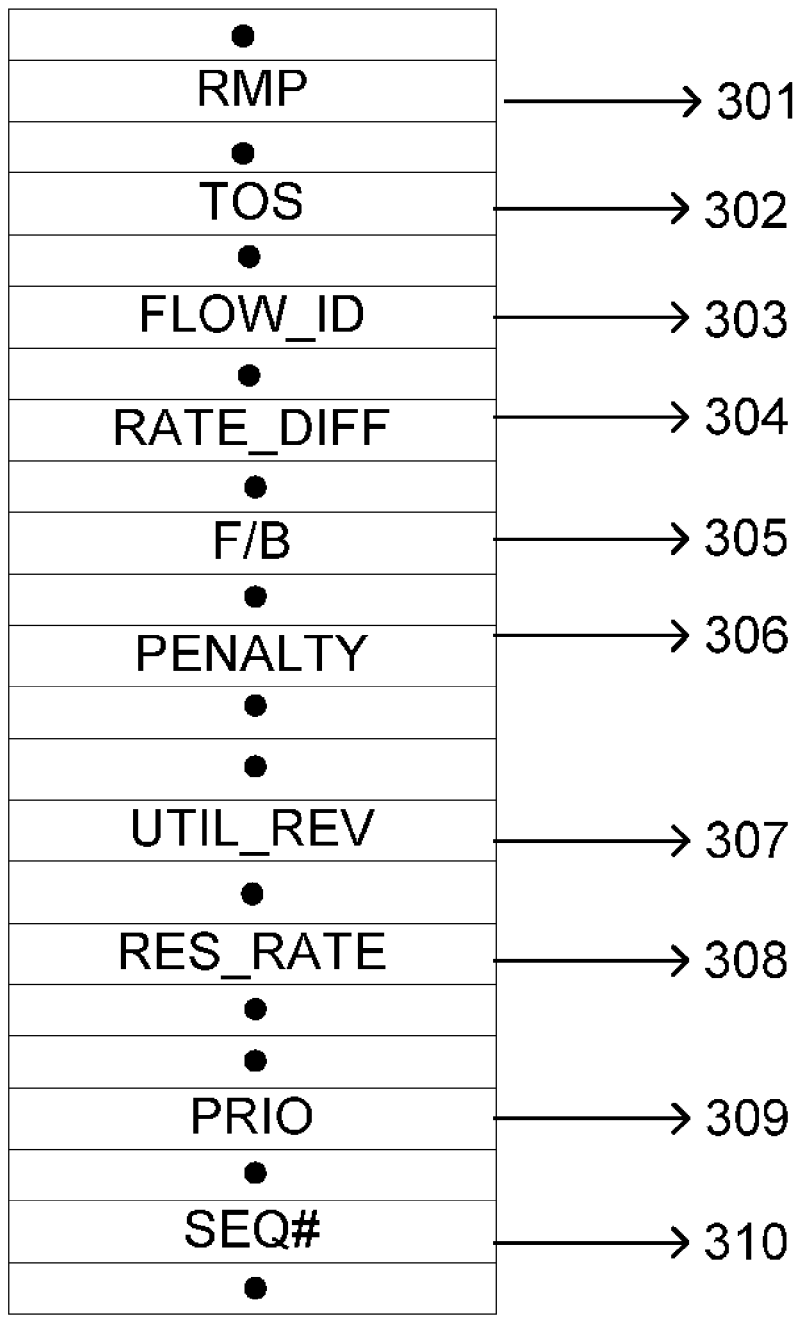
FIG. 3 is a simplified block diagram of one embodiment of elements illustrating some of the content contained in an RMP IP packet utilized by the processes of the present invention.

Continuing with FIG. 3, the RMP field 301 comprises a unique pattern of one or more bits in the IP packet header identifying it as an RMP packet. An exemplary embodiment of this field is by utilizing the protocol field in the IP packet header in accordance with IETF RFC 791. The TOS field 302 comprises a pattern of one or more bits in the IP packet header identifying the QoS level of that IP packet. An exemplary embodiment of this field is by utilizing the TOS field in the IP packet header in accordance with IETF RFC 791. The FLOW_ID field 303 comprises a pattern of one or more bits in the IP packet header identifying the packet flow in its respective source edge router process. An exemplary embodiment of this field is by utilizing the options field in the IP packet header in accordance with IETF RFC 791. The RATE_DIFF field 304 comprises a pattern of one or more bits in the IP packet header containing the difference between the current and the previous transmission rates allocated to the respective flow. That is, if FLOW_ID 303 identifies flow i in the edge router process originating the RMP packet, then RATE_DIFF 304 contains the current value in the $i^{th}$ row of column R_Diff 215 in Table 210 in FIG. 2a. An exemplary embodiment of this field is by utilizing the options field in the IP packet header in accordance with IETF RFC 791. The F/B field 305 comprises a pattern of one or more bits in the IP packet header identifying whether the RMP packet is a forward RMP packet or a backward RMP packet. An exemplary embodiment of this field is by utilizing the options field of the IP packet header in accordance with IETF RFC 791. The field PENALTY 306 comprises a pattern of one or more bits in the IP packet header containing the following network feedback information. If field RES_RATE 308 is zero, PENALTY 306 contains an additive feedback value accumulated in each core router process along the forward path from the source edge router process to the destination edge router process. Accumulation is done in each core router process traversed by the RMP packet as a forward RMP packet in accordance to the method of the present invention. If field RES_RATE 308 is positive, PENALTY 306 contains either one, if the additional rate of RES_RATE can be accommodated along the forward flow path, or zero, otherwise. If field RES_RATE 308 is negative, PENALTY 306 is irrelevant. An exemplary embodiment of this field is by utilizing the options field of the IP packet header in accordance with IETF RFC 791. The UTIL_REV field 307 comprises a pattern of one or more bits in the IP packet header indicating to each core router process traversed by this packet as a forward RMP packet how to update the variables in column bw_util 272 of Table 270 in FIG. 2b. An exemplary embodiment of this field is by utilizing the options field of the IP packet header in accordance with IETF RFC 791. The RES_RATE field 308 comprises a pattern of one or more bits in the IP packet header indicating to each core router process traversed by this packet as a forward RMP packet the difference in the reserved bandwidth required by the corresponding flow. An exemplary embodiment of this field is by utilizing the options field of the IP packet header in accordance with IETF RFC 791. The PRIO field 309 comprises a pattern of one or more bits in the IP packet header indicating to each core router process traversed by this packet as a forward RMP packet the scheduling priority required by the corresponding QoS level indicated in field TOS 302. An exemplary embodiment of this field is by utilizing the options field of the IP packet header in accordance with IETF RFC 791. The SEQ# field 310 comprises a pattern of eight or more bits indicating the sequence number of the RMP packet.

Figure 4:
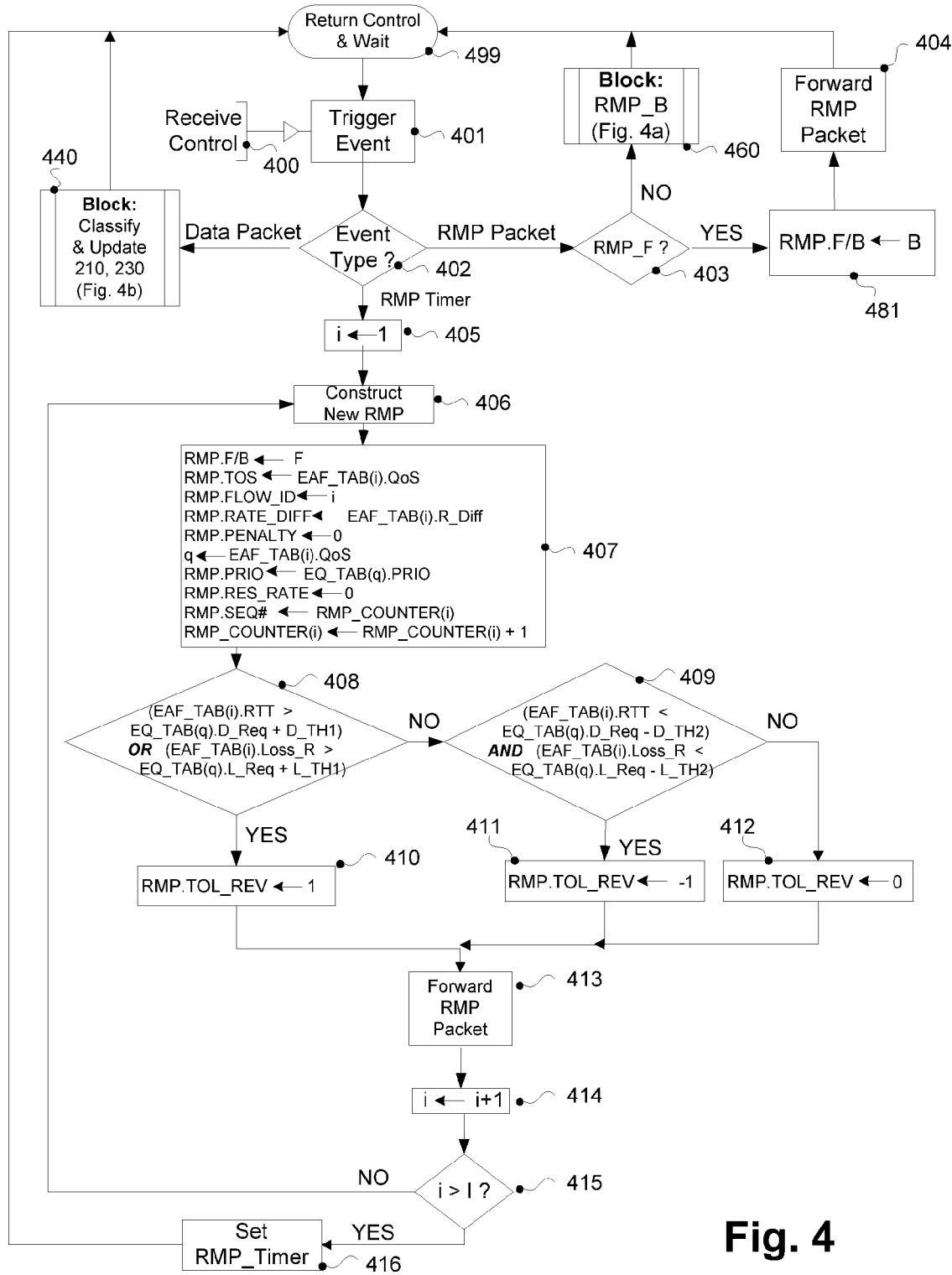
FIG. 4 is a simplified flow chart illustrating one embodiment of the edge router process for updating the parameters, the fields of the RMP IP packet and the data structure utilized for computing the required fair flow rates in accordance with the method of the present invention.
Figure 4A:
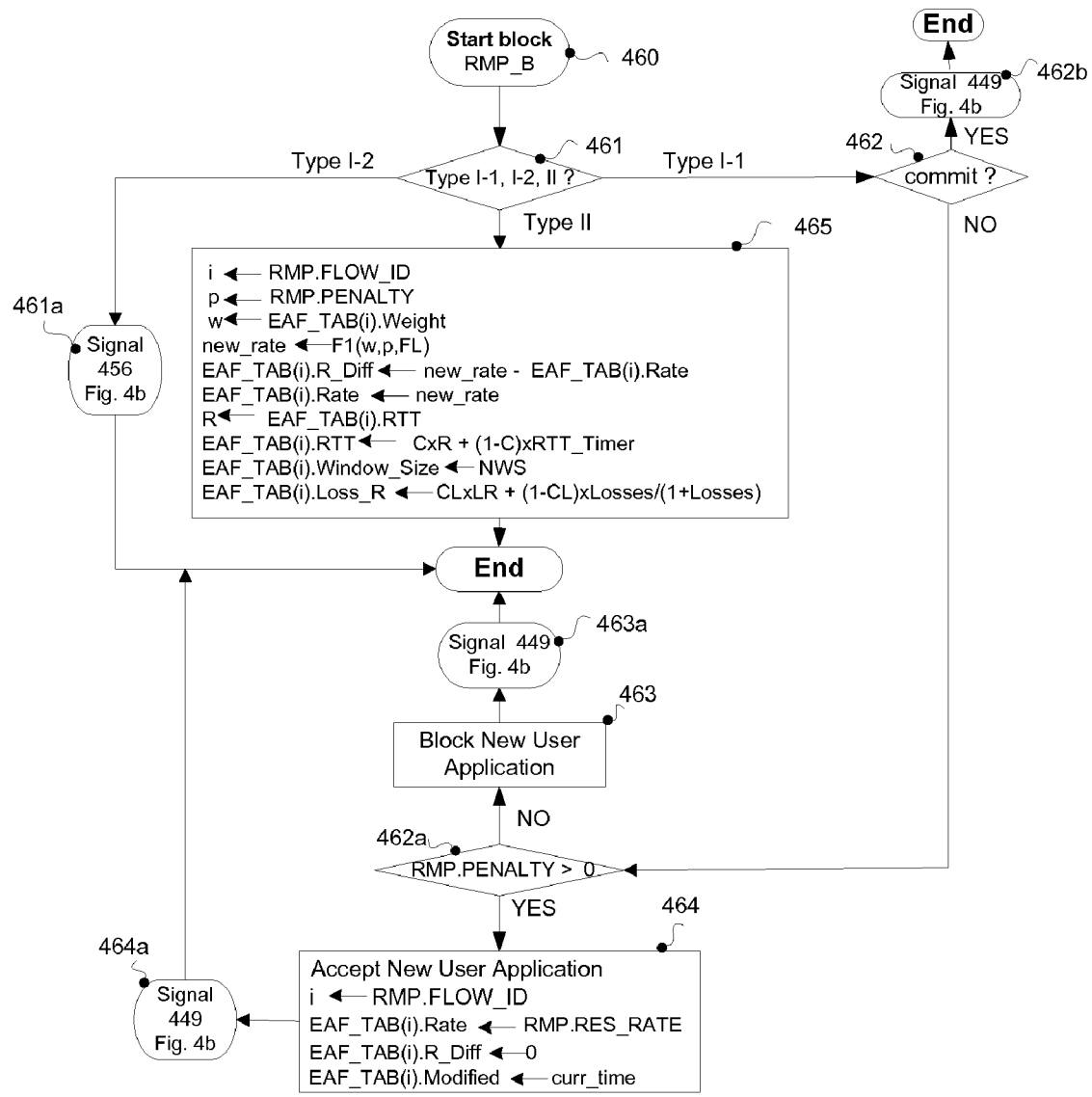
FIG. 4a is a simplified flow chart refining one block from FIG. 4 illustrating one embodiment of the edge router process for updating the parameters and the data structures in accordance with the method of the present invention when the incoming packet is a backward RMP packet.
Figure 4B:
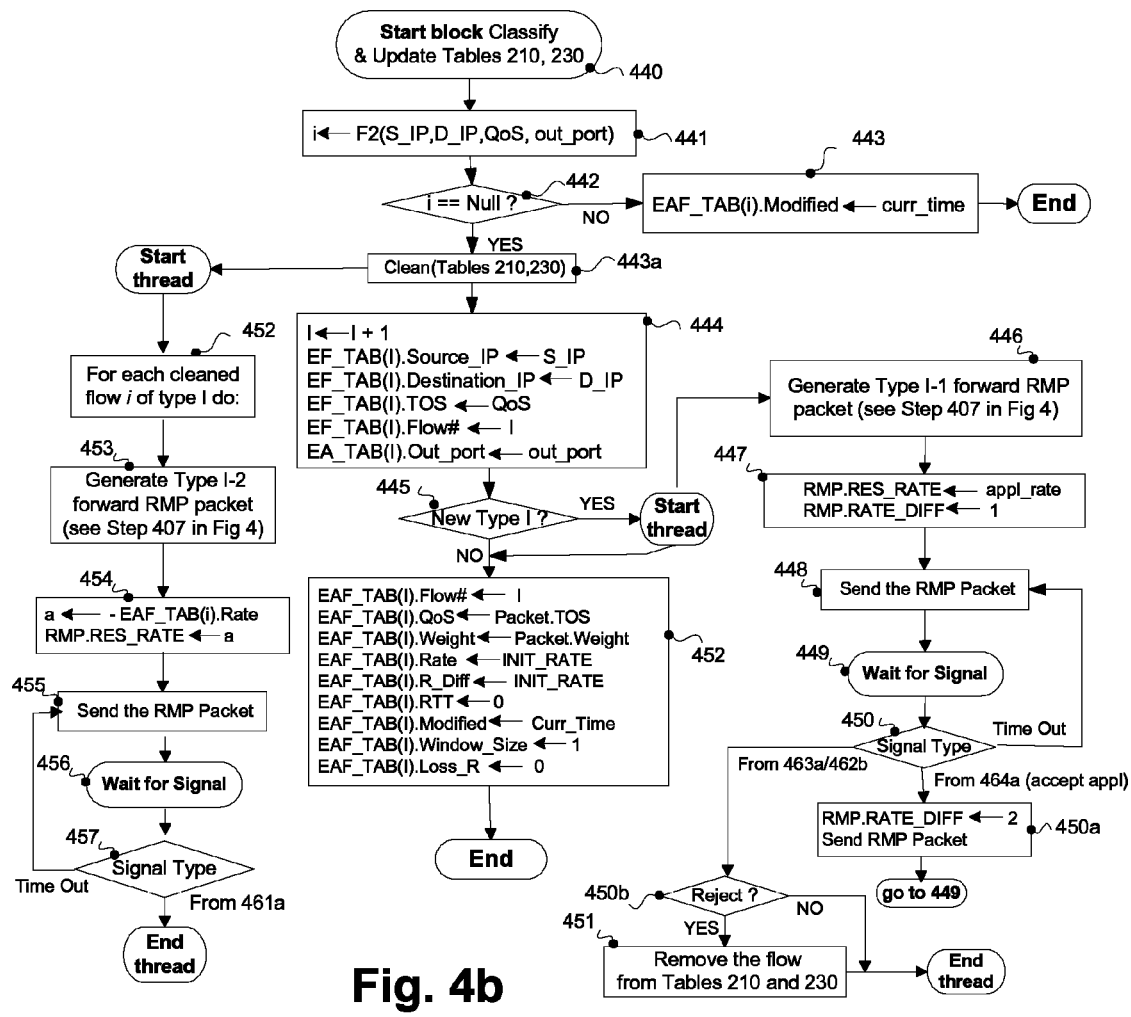
FIG. 4b is a simplified flow chart refining another block from FIG. 4 illustrating one embodiment of the edge router process for updating the list of active flows in accordance with the method of the present invention when the incoming packet is a new data packet.

FIGS. 4, 4*a* and 4*b* depict the flowchart of an edge router process of the method of the present invention determining the active flows and computing their transmission rates so as to meet their QoS requirements. In FIG. 4, the edge router process gains control at step 400 where a triggering event is passed in step 401. The triggering event could be one out of three types checked in step 402. If the event type is an arrival of an IP data packet, i.e., other than an RMP packet, then the process executes block 440 illustrated in FIG. 4*b* and explained hereinafter, which classifies the packet into an active flow and updates Tables 210 and 230 in FIG. 2*a*. In one embodiment of the present invention, in such event, the output link identifier, denoted by out_port, through which the packet will be switched out in the edge router, is made known to the edge router process. In another embodiment of the present invention, out_port is not utilized for flow classification.

Continuing with the edge router process set forth above, if the event type is an arrival of an RMP packet, the packet is checked in step 403 whether or not it is a forward RMP packet. If affirmative, then in step 481 the field F/B 305 in the RMP packet 300 is marked as a backward RMP packet. Then, in step 404, the process swaps between the source and destination address fields in the RMP packet header, performs all required modifications in the IP packet header to make it a valid IP packet and forwards it for transmission back to the originating edge router process as a backward RMP packet. Afterward, it returns control and waits for another triggering event in step 499. If the check in step 403 is negative, i.e., the packet is backward RMP packet, then the process executes block 460 illustrated in FIG. 4*a* and described hereinafter, where the variables of the respective flow from Table 210 in FIG. 2*a* are updated. Afterward, it disposes the RMP packet, returns control and waits for another triggering event in step 499.

Continuing with the edge router process set forth above, if the RMP_Timer 241 in FIG. 2*a* has expired, a new forward RMP packet is constructed for each active flow from Table 210 in FIG. 2*a* and forwarded for transmission. The construction and forwarding are described in steps 406-416. Label i is initialized to one in step 405 and is incremented by one in step 414 after every loop cycle, indexing to the current active flow. For each i, a new RMP packet is constructed in step 406. In step 407, field F/B 305 in the RMP packet 300 is marked as a forward RMP packet; field TOS 302 in the RMP packet 300 is set to the QoS value of flow i taken from column QoS 212 of Table 210 in FIG. 2*a*; field FLOW_ID 303 in the RMP packet 300 is set to the identification of flow r; field RATE_DIFF 304 in the RMP packet 300 is set to the rate difference of flow i taken from column R_Diff 215 of Table 210 in FIG. 2*a*; field PENALTY 306 in the RMP packet 300 is set to zero; field PRIO 309 in the RMP packet 300 is set to the value of PRIO 226 in Table 220 corresponding the TOS field 302 of that RMP packet; field RES_RATE 308 in the RMP packet 300 is set to zero; field SEQ# 310 in the RMP packet 300 is set to the value of the RMP_COUNTER 243 in FIG. 2*a* corresponding to flow i; and the RMP_COUNTER 243 for flow i is incremented by one.

Continuing with the edge router process set forth above, steps 408-413 computes the value for field UTIL_REV 307 in the RMP packet 300. Namely, an update indicator to the core router processes if the packet round trip time or the packet loss rate of flow i do not conform to the flow QoS requirement. The algorithm performed is steps 408-413 is as follows. The variables EAF_TAB(i).RTT and EAF_TAB(i).Loss_R denote the current estimated RTT and loss rate of packets from flow i as given in columns RTT 216 and Loss_R 219 of Table 210 in FIG. 2*a*, respectively. The variables EQ_TAB(q).D_Req and EQ_TAB(q).L_Req denote the required maximum end-to-end packet delay and the required maximum packet loss rate for a flow from QoS level q as specified in column D_Req 222 and L_Req 224 of Table 220 in FIG. 2*a*, respectively. If the estimated RTT is greater than the required maximum end-to-end packet delay plus the threshold D_TH1 206 in FIG. 2*a*; or if the estimated packet loss is greater than the required maximum packet loss rate plus the threshold L_TH1 206*a* in FIG. 2*a* (step 408), then field UTIL_REV 307 in the RMP packet 300 is set to one (step 410) marking to the core router processes that the flow fair rates should be reduced. If the estimated RTT is less than the required maximum end-to-end packet delay minus the threshold D_TH2 207 in FIG. 2*a*; and if the estimated packet loss is also less than the required maximum packet loss minus the threshold L_TH2 207*a* in FIG. 2*a* (step 409), then field UTIL_REV 307 in the RMP packet 300 is set to minus one (step 411) marking to the core router processes that the flow fair rates could be increased. Otherwise, field UTIL_REV 307 in the RMP packet 300 is set to zero (step 412) marking to the core router processes that no change is needed when calculating their penalty variables. In step 413, the forward RMP packet contains the data required by the method of the present invention. Further in step 413, the IP address of the destined user device for flow i, taken from column Destination_IP 232 of Table 230 in FIG. 2*a*, is set to the destination address field of the RMP IP packet header. Even further in step 413, the IP address of the source user device for flow i, taken from column Source_IP 231 of Table 230 in FIG. 2*a*, is set to the source address field in the RMP IP packet header. Then, all required modifications in the RMP IP packet header are performed so as to make it a valid IP packet and the packet is forwarded for transmission. When the packet is forward for transmission, in one embodiment of present invention where the edge router process is implemented inside the edge router, out_port variable for flow i taken from column Out_Port 235 of Table 230 in FIG. 2*a*, is also passed notifying which core output link should be used for transmission. A check if all flows have been exhausted is done in step 415, in which case the RMP_Timer 241 in FIG. 2*a* is set again in step 416; and control is returned and the process waits for another triggering event in step 499.

Continuing with the edge router process set forth above, FIG. 4*a* illustrates in more details the flow in block 460 specified above when the triggering event checked in step 402 is a backward RMP packet. There are three types of backward RMP packets: Type I-1 is a backward RMP packet corresponding to a new flow of Type I, i.e., an end user application with a minimum transmission rate requirement wishing to join the network; Type I-2 corresponds to a Type I flow which cease to be active; and Type II backward RMP packets correspond to any active flow, either of Type I or of Type II. Since bandwidth reservation requires reservation along a plurality of links, a two phase commit reservation procedure is utilized. Consequently, Type I-1 RMP packets are subdivided into normal and commit subtypes. Any backward RMP packet returning to its source edge router process carries the flow identifier i in its FLOW_ID field 303. Furthermore, field RES_RATE 308 marks its type. If RES_RATE 308 is positive, it is of Type I-1; If RES_RATE 308 is negative, it is of Type I-2; and if RES_RATE 308 is zero, then it is of Type II. Furthermore, the subtypes of Type I-2 are determined from its field RATE_DIFF 304. If field RATE_DIFF 304 equals 1, it is a normal subtype; and if it equals 2, it is a commit subtype. It worth noting that the method of the present invention transmits RMP packets of Types I-1 and I-2 using a reliable protocol and only when a new Type I flow enters the network or when an active Type I flow cease to be active, respectively. RMP packets of Type II are transmitted for every active flow on a regular basis whenever the RMP_Timer 241 in FIG. 2a expires. When a new Type I flow wishes to join the network (see processing block 440 above, a normal Type I-1 forward RMP packet having a positive value in field RES_RATE 308 and one in RATE_DIFF 304 is transmitted. When it returns as a backward RMP packet, its field PENALTY 306 contains an admission flag, where a positive value indicates that the end user application can be admitted to the network and a non-positive value indicates that the end user application should be blocked. The type of the backward RMP packet is checked in step 461. If the backward RMP packet is not a commit Type I-1 packet (checked in step 462) and its field PENALTY 306 is positive (checked in step 462a), then in step 464, the corresponding end user application requesting the additional rate is accepted to the network. Further in step 464, the value of field RES_RATE 308, the value zero and the current local time are set in the $i^{th}$ row of column Rate 214, column R_Diff 215 and column Modified 217 of Table 210 in FIG. 2a, respectively. Afterward, in step 464a, a signal is sent to step 449 of the process depicted in FIG. 4b. If the field PENALTY 306 of the Type I backward RMP packet is not positive, the corresponding end user application requesting the additional rate is blocked in step 463. Then, in step 463a, a signal is sent to step 449 of the process depicted in FIG. 4b. If the backward RMP packet is a commit Type I-1 packet (checked in step 462), then in step 462b, a signal is sent to step 449 of the process depicted in FIG. 4b. It is noted here that a commit Type I-1 packet is sent in step 450a of the process depicted in FIG. 4b after the flow has been admitted to the network. When an existing user application having a minimum rate leaves the network, a forward RMP packet with a negative value in field RES_RATE 308 is transmitted. If a backward RMP packet is of Type I-2, then in step 461a a signal is sent to step 449 of the process depicted in FIG. 4b. An RMP backward packet of Type II (with zero in field RES_RATE 308) carries updated feedback information in its field PENALTY 306 that is accumulated in each core router process along the forward route of the respective flow i. This update information is relevant only for flows of Type II. RMP backward packets of Type II are processed in step 465 as follows. For flows of Type II only, field PENALTY 306 is utilized for updating Table 210 in FIG. 2a. The major part of this update is given by the following function, F1(w,p,FL), which computes the new fair rate for flow i by:

$$F1(w,p,FL)=(w/p)^{1/FL}.$$

Here, w is the weight of flow i given in column Weight 213 of Table 210 in FIG. 2a; p is the feedback value in the PENALTY field 306 of the backward RMP packet; and FL is the FAIR_LEVEL constant 201 in FIG. 2a. For flows of Type I, F1(w,p,FL) is set to reserved rate of the flow taken from row i of column Rate 214 in Table 210. The implementation of function F1 in software or in hardware using application specific integrated circuit (ASIC) is done by utilizing conventional quantization techniques used in digital signal processing.

Continuing with step 465 in FIG. 4a, before setting the new fair rate in Table 210 in FIG. 2a, the difference between F1(w,p,FL) and the present value of the fair rate for flow i given in column Rate 214 of Table 210 in FIG. 2a is set in row i of column R_Diff 215 in Table 210 for flow i. Only then, the new rate, F1(w,p,FL), is set in row i of column Rate 214 in Table 210.

Continuing with step 465 in FIG. 4a, for each flow type (Type I or II), a new estimator for the round trip time of the packets from flow i is computed by:

$$n\_rtt=C \times R+(1-C) \times RTT\_Timer.$$

Here, R is the current RTT estimator for packets from flow i given in column RTT 216 of Table 210 in FIG. 2a; RTT_Timer is the time extracted from the RTT_Timer 242 providing the round trip time of the present RMP packet; and C is the RTT_CONST 204 in FIG. 2a. The result n_rtt is set in row i of column RTT 216 in Table 210 in FIG. 2a.

Continuing with step 465 in FIG. 4a, for each flow type, a new maximum window size for flow i is computed by:

$$n\_window\_size=CW \times Window\_Size+(1-CW) \times RTT \times Rate.$$

Here, RTT, Rate and Window_Size are the current values in row i and columns RTT 216, Rate 214 and Window_Size 218 of Table 210 in FIG. 2a, respectively; CW is the WIN_CONST 204b in FIG. 2a. Then, the minimum between WIN_UB 204c in FIG. 2a and n_window_size, denoted by NWS in FIG. 4a, is set in row i of column Window_Size 218 in Table 210 in FIG. 2a.

Continuing with step 465 in FIG. 4a, for each flow type, an estimator for the packet loss rate of flow i is computed by:

$$n\_loss\_r=CL \times L\_R+(1-CL) \times Losses/(Losses+1).$$

Here, L_R is the current loss rate estimator for packets from flow i given in column Loss_R 219 of Table 210 in FIG. 2a. CL is the LOSS_CONST 204a in FIG. 2a and Losses is the gap in the sequence numbers between the value in field SEQ# 310 of the current and the previously processed backward RMP packets corresponding to the same flow i. That is, Losses is the number of forward RMP packets corresponding to flow i that have lost or delayed between two consecutive backward RMP packets that have returned to the source edge router process. For example, if the SEQ# 310 fields of two consecutive backward RMP packets from flow i that have returned to the source edge router process are 1000 and 1010, then Losses takes the value 9. The result, n_loss_r, is set in column Loss_R 219 of Table 210 in FIG. 2a in the row corresponding to flow i.

The computation of the fair rates must be performed in a timely and efficient manner such that the convergence to the fair rates is fast. In such conditions, accurate allocation of link bandwidth would be based on the most current state of the active flows and their fair rates. An accurate estimate of the active flows is needed to best utilize the link bandwidth. If inactive flows are mistakenly considered as active, link bandwidth would be under-utilized; and if active flows are mistakenly considered as inactive, congestion would occur. In the system and method of the present invention a flow is considered active if and only if IP packet transmission has been observed in the edge router within a predetermined time frame.

Continuing with the edge router process set forth above, FIG. 4b depicts in more details the flowchart of block 440 specified above, when the triggering event checked in step 402 is a data packet. Recall that data packets could be belong either to flow of Type I or to flow of Type II. In one embodiment of the present invention, at this event, the output link identifier, denoted by out_port, through which the packet will be switched out by the edge router, is made known to the process. In another embodiment, out_port is set to a wildcard and is not being utilized. In the preferred embodiment of the present invention, the rate by which data IP packets pass control in step 400 is limited so as to meet the processing time required for one triggering event. Also, in the preferred embodiment of the present invention, the TOS field in the IP data packet arriving to the edge router process is already translated into a valid QoS identifier set in accordance to the network administrator policy.

Continuing with the process set forth above, in step 441, the function F2(S_IP,D_IP,QoS,out_port) scans Table 230 in FIG. 2a to determine if the data packet can be classified into an active flow based on the variables S_IP,D_IP,QoS and out_port, where S_IP,D_IP,QoS are the values extracted from fields source address, destination address and TOS in the header of the IP data packet, respectively. As explained in the specification of Table 230 in FIG. 2a above, S_IP and D_IP are two IP addresses of user devices in the source and destination network numbers, respectively, extracted from the source and destination addresses of the IP packet header. If an active flow is found in Table 230, the flow identification is set to variable i. Otherwise, a null indicator is set to i. The value of i is checked in step 442. If an active flow is found, then in step 443 column Modified 217 in row i of Table 210 in FIG. 2a is set to the current local time and the processing of block 440 terminates. Otherwise, in step 443a, the function Clean (Tables 210,230) scans Tables 210 and 230 in FIG. 2a and deletes each flow whose value in column Modified 217 of Table 210 is less than the current local time minus the threshold value IDLE_TH 208 in FIG. 2a. That is, no activity has been detected for those flows during the last IDLE_TH time units. After step 443a, the process continues with two threads. The main thread continues in step 444 and a second thread continues in step 452.

Continuing with the process set forth above, in the thread starting in step 452, for each cleaned flow of Type I, a new forward RMP packet of Type I-2 is generated in step 453 as is done in step 407 in FIG. 4 with the difference that field RES_RATE 308 in FIG. 3 is set in step 454 to minus the required minimum rate of the departing user application as taken from column Rate 214 of Table 210 in FIG. 2a. Then, the RMP packet is forwarded for transmission in step 455 and a timeout interval timer is triggered. Next, the thread waits for a signal in step 456. If a timeout occurs before any signal arrives, the thread returns to step 455, retransmits the same forward RMP packet and re-triggers the timeout interval timer. If a signal from step 461a of the process depicted in FIG. 4a arrives before a timeout occurs, the thread ends.

Continuing with the process set forth above, in the main thread continuing in step 444, variable I is incremented by one; a new row is added to Table 230 in FIG. 2a for accommodating the data of the new flow labeled as I; and the values in row I of columns Source_IP 231, Destination_IP 232, QoS 233, Flow# 234 and Out_Port 235 of Table 230 in FIG. 2a are set to the parameters S_IP, D_IP, QoS, I and out_port, respectively, which have been passed in step 401 of FIG. 4. In step 445, the flow type of the new data packet is checked. If it is a new Type I (i.e., a new end user application requiring a minimum transmission rate and wishing to enter the network), a new thread is started by the main thread executing steps 446-451. Also, for any flow type, the main thread continues in step 452. The thread starting in step 446 generates a normal forward RMP packet of Type I-1 as is done in step 407 of FIG. 4, with the difference that its fields RATE_DIFF 304 and RES_RATE 308 in FIG. 3 are set in step 447 to the required minimum rate of the new user application and one, respectively. Then, the RMP packet is forwarded for transmission in step 448 and the process thread triggers a timeout interval timer and waits for a signal in step 449. If a timeout occurs before any signal arrives, the thread returns to step 448, retransmits the same forward RMP packet and re-triggers the timeout interval timer. If the signal is from step 464a of the process depicted in FIG. 4a (i.e., accept signal), then in step 450a, the normal RMP forward packet is changed into a commit RMP forward packet by setting 2 into its field RES_RATE 308 in FIG. 3, the timeout interval time is triggered, the RMP packet is forwarded for transmission and the thread waits for a signal in step 449. If the signal is from step 463a or step 462b of the process depicted in FIG. 4a, then it is further checked in step 450b whether it is from step 463a (i.e., reject signal) or from step 462b (a commit packet return signal). If it is a reject signal, then the flow entries in Tables 210 and 230 are removed and the thread terminates. If it is a commit return, then the thread terminates.

Continuing with the process set forth above, in the main thread continuing in step 452, the data of the new flow is set to Table 210 as follows: I, packet.TOS, packet.Weight, INIT_RATE 205, INIT_RATE 205, 0, current local time, 1 and 0 are set in row I of columns Flow# 211, QoS 212, Weight 213, Rate 214, R_Diff 215, RTT 216, Modified 217, Window_Size 218 and Loss_R 219, respectively. Here, packet.TOS is the value taken from the TOS field of the data packet header and packet.Weight is the value in column Weight 225 of Table 220 in FIG. 2a corresponding to the QoS level of the packet as listed in column QoS 221 of Table 220 in FIG. 2a.

Figure 5:
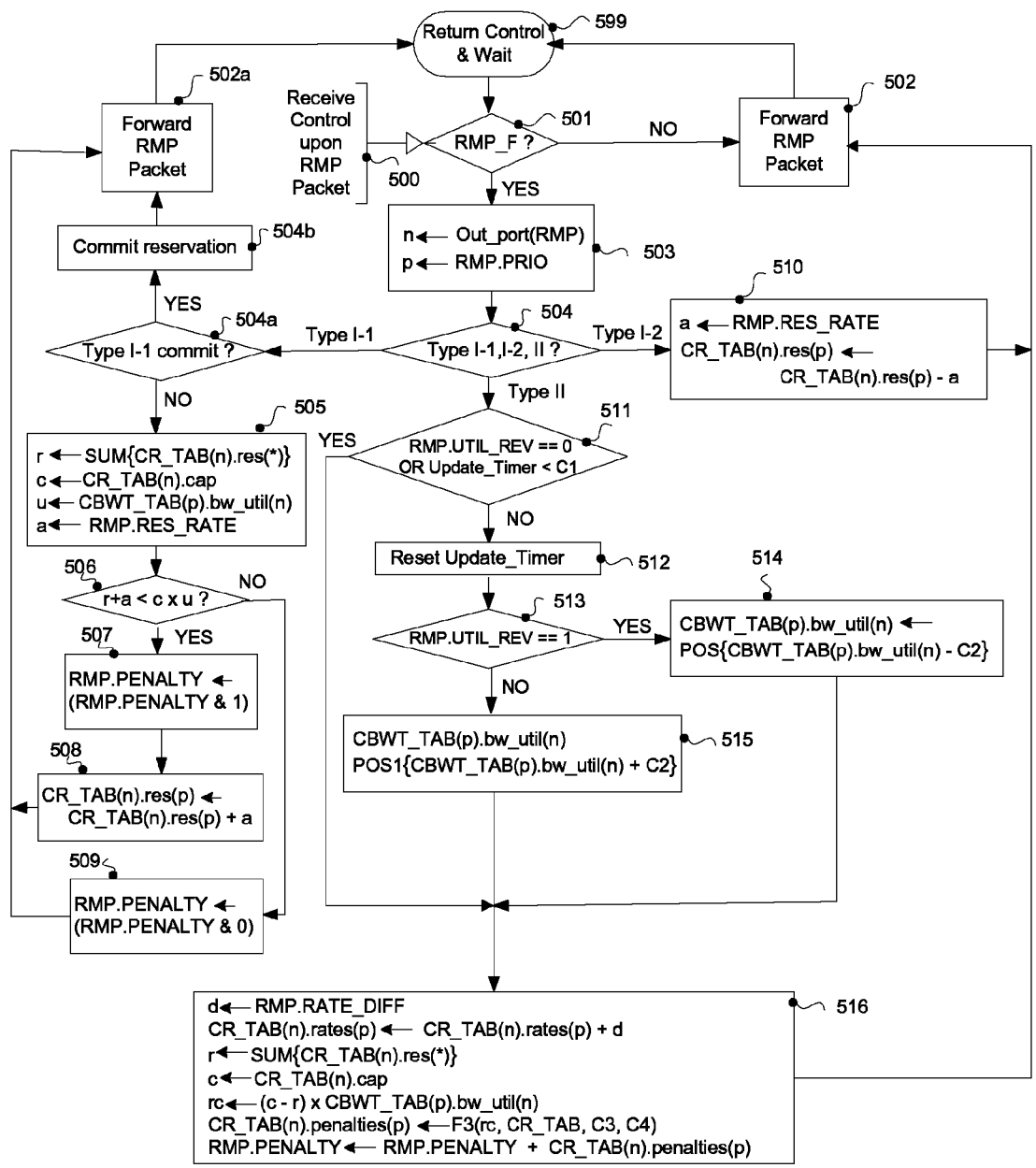
FIG. 5 is a simplified flow chart illustrating one embodiment of the core router process for updating the parameters, the RMP packet fields and the data structures utilized for shaping the required flow rates in accordance with the method of the present invention.

FIG. 5 depicts the flowchart of a core router process of the method of the present invention computing the feedback information utilized by the edge router processes for Type I flow admission control, packet delay and loss rate estimation and for updating the fair rates of Type II flows. The core router process receives control in step 500 where the RMP packet and the output port through which the corresponding flow is switched out by the core router are made known to the process. The RMP packet type is checked in step 501. If it is a backward RMP packet, the packet is just being forwarded for transmission downward its route in step 502. Then, in step 599, control is returned and the process waits for regaining control. If the RMP packet is a forward RMP packet, then in step 503, the PRIO 309 from the RMP packet is set to variable p and the output port is set to variable n. Then, in step 504 the type of the forward RMP packet is checked. If it is of Type I-1 (a new end user application with minimum required rate wishing to join the network), then its subtype is further checked in step 504a. If it is not a commit Type I-1 forward RMP packet, then the current residual capacity is checked in steps 505 and 506 as follows. If the sum of the reserved capacity for all priority levels in link n (given in the $n^{th}$ row of column res 263) plus the required reserved rate (given in field RES_RATE 308 of the RMP packet) is less than the link capacity (given in the $n^{th}$ row of column cap 262) times the maximum link utilization permitted for packets associated with flows having priority equal to p or higher (as given in row p and column bw_util 272 for link n of Table 270), then the new Type I flow can be admitted by the present core router. The local admission decision is marked in field PENALTY 306 of the RMP packet by taking, in step 507, a logical AND between the present value of PENALTY 306 and one. At this event, in step 508, the reserved bandwidth for priority level p in the $n^{th}$ row of column res 263 of Table 260 is conditionally increased by the value of field RES_RATE 308 in the RMP packet. The conditional increase is committed only after a commit Type I-1 forward RMP packet is received. Also, since Type I-1 RMP packets are sent by a reliable protocol, reserved rate is not updated more than once for Type I-1 RMP packets with the same sequence number. If the check result in step 506 is negative, then the new Type I flow cannot be admitted by the present core router. The local rejection (which is also a global rejection) is marked in field PENALTY 306 of the RMP packet by taking, in step 509, a logical AND between its present value of PENALTY 306 and zero. After both steps, 508 and 509, the RMP packet is forwarded for transmission in step 502a and control is returned in step 599. If the check in step 504a revels that the packet is a commit Type I-1 forward RMP packet, then the reservation is committed is step 504b, the RMP packet is forwarded for transmission in step 502a and control is returned in step 599. It is noted that the value of field PENALTY 306 can be checked in step 505, and if it equals zero, then steps 506-509 can be skipped and the process may continue to step 502a.

Continuing with the process set forth above, if the forward RMP packet (checked is step 504) is of Type I-2 (an end user application with minimum required rate which ceases to be active), then in step 510 the RES_RATE 308 from the RMP packet is subtracted from the rate reserved in link n for Type I flows with priority p. Since Type I-2 RMP packets are sent by a reliable protocol, reserved rate is not updated more than once for Type I-2 RMP packets with the same sequence number. Afterward, the RMP packet is forwarded for transmission in step 502 and control is returned in step 599. If the forward RMP packet (checked is step 504) is of Type II (an RMP packet corresponding to any active flow), local tables and feedback information are updated in steps 511-516 as follows. Before computing the penalty feedback contributed by the present core router to the total penalty feedback information, field UTIL_REV 307 in the RMP packet 300 is being processed in steps 511-515. In step 511, UTIL_REV 307 and Update_Timer 281 in FIG. 2b are checked. If UTIL_REV 307 is not zero and Update_Timer 281 is greater than UPD_TIMER_CONST (C1) 251 in FIG. 2b, then Table 270 in FIG. 2b is updated with new bandwidth utilization. The role of Update_Timer 281 is to prevent too frequent updates of Table 270. The field UTIL_REV 307 informs the core router process whether or not the packet RTT and packet loss requirements of the respective flow are met. In step 512, Update_Timer 281 is reset and in step 513 UTIL_REV 307 is checked whether the link bandwidth utilization should be incremented or decremented. If a decrement is required, the value for link n in row p and column bw_util 272 of Table 270 is decremented by the function POS{CBWT_TAB(p).bw_util(n)−C2} in step 514. The function POS decrements the constant BW_UTIL_CONST (C2) 252 in FIG. 2b from the bandwidth utilization upper bound of link n and priority p specified in column bw_util 272, but not below zero. Furthermore, to keep the required increasing order CBWT_TAB(1).bw_util(1)<CBWT_TAB(2).bw_util(n)< . . . <CBWT_TAB(P).bw_util(n), the function POS possibly decrements the values of CBWT_TAB(i).bw_util(n), i=1, . . . , p−1, accordingly, but not below zero. If an increment is required, the value for link n in row p and column bw_util 272 of Table 270 is incremented by the function POS1{CBWT_TAB(p).bw_util(n)+C2} in step 515. The function POS1 adds the constant BW_UTIL_CONST (C2) 252 in FIG. 2b to the bandwidth utilization upper bound of link n and priority p specified in column bw_util 272, but not above one. To preserve the increasing order above, the function POS1 possibly increments the values of CBWT_TAB(i).bw_util(n), i=p+1, . . . , P, accordingly, but not above one.

Continuing with the core router process set forth above, in step 516 the total current rate traversing output link n from all Type II flows with priority level p (the level of the present forward RMP packet) is updated in Table 260 in FIG. 2a by adding RATE_DIFF 304 from the RMP packet 300 to the value in row n and column rates 265 of Table 260 for priority level p. Note that for flows of Type I, RATE_DIFF 304 is zero. Further, the summation of all reserved bandwidths in link n for each priority level, p, as given in the $n^{th}$ row and column res 263 of Table 260, denoted by CR_TAB(n).res(p), is set to variable r. Furthermore, the residual capacity currently allocated for Type II flows with priority levels 1, 2, . . . , p is set to variable rc. The residual capacity is computed by subtracting r from the link capacity (given in the $n^{th}$ row and column cap 262 of Table 260) and multiplying the difference by the bandwidth utilization upper bound for link n (given in row p and column bw_util 272 of Table 270). Then, the function F3 as specified below is invoked to compute the contribution to the PENALTY 306 field in the RMP packet.

To specify function F3, any continuous and strictly increasing function $f_{p,n}(c)$ of a capacity c, which is parameterized by the priority level p and the output link n and satisfying $f_{p,n}(0)=0$, is chosen. The preferred embodiment in the present invention uses the function:

$$f_{p,n}(rc) = rc \times PEN_{p,n}/(PEN_{p,n}+e).$$

Here, rc is the residual capacity set forth above; $PEN_{p,n}$ is the current penalty value for output link n and priority p given in row n and column penalties 264 of Table 260 in FIG. 2b; and e is given by APPROX_CONST 254 in FIG. 2b.

Continuing with the specification of function F3 set forth above, its output value is given by:

$$pos[PEN_{p,n}+C3\times(Rate(n,p)-f_{q,n}(rc))].$$

Here, rc is the residual capacity set forth above; $PEN_{p,n}$ is the current penalty value for output link n and priority p given in row n and column penalties 264 of Table 260 in FIG. 2b; $f_{p,n}(rc)$ is set forth above; C3 is given by PENALTY_CONST (C3) 253 in FIG. 2b; Rate(n,p) is the sum of all transmission rates from all Type II flows with priority levels 1, 2, . . . p, designated for transmission through output link n as given in row n and column rates 265 of Table 260 in FIG. 2b; and pos[X] is the non-negative part of variable X.

Continuing with the specification of function F3 set forth above, its implementation in software or in hardware using ASIC is done by utilizing conventional quantization techniques from digital signal processing. The output value of function F3 is set to row n of penalties column 264 in Table 260 in FIG. 2b for priority level p. It is also added to field PENALTY 306 in the RMP packet 300 that is being processed. Then, in step 502, the updated RMP packet is forwarded for transmission downward its route, after which control is returned in step 599 and the process waits for receiving control again.

An essential part in the method of the present invention is a transmission control algorithm; hereinafter flow shaper, which shapes the transmission rate of every active flow in accordance to its current allocated rate given in column Rate

214 of Table 210 in FIG. 2a. In one embodiment of the method of the present invention, the flow shapers are utilized in the edge routers. In another embodiment, the flow shapers are utilized in the end user OSI transport layer module, e.g., in the TCP module.

Figure 6:
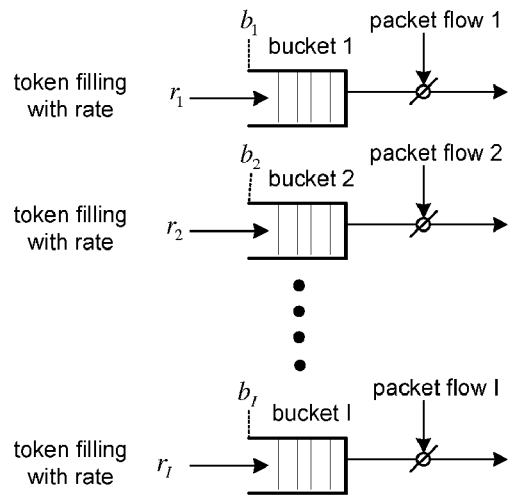
FIG. 6 is a simplified diagram illustrating one embodiment of a token bucket flow shaper utilized by the method of the present invention.

A well established flow shaper utilized by a plurality of routers and illustrated in FIG. 6 is known as token bucket. With token bucket, each active flow, i, is associated with a bucket to which a new token is added every $1/r_i$ seconds, where $r_i$ (referred to as the token rate), is the desired flow rate (in bytes per second). Bucket i can hold at the most $b_i$ tokens, referred to as bucket size. If a token arrives when the bucket is full, it is discarded. When a data packet of n bytes from flow i arrives and n tokens exist in the bucket, then n tokens are removed from bucket i, and the packet is sent to the network. If fewer than n tokens are available, no tokens are removed from the bucket and the packet is considered to be non-conformant. Non-conformant packets can be treated in various ways: they may be dropped; they may be queued for subsequent transmission when sufficient tokens have accumulated in the bucket; or they may be transmitted, but marked as being non-conformant, possibly to be dropped subsequently if the network is overloaded.

One preferred embodiment of the flow shaper in the method of the present invention is the token bucket control where the token rate, $r_i$, of each active flow i in Table 210 in FIG. 2a varies in time and is given by the current respective value in column Rate 214 of Table 210 in FIG. 2a.

Figure 7:
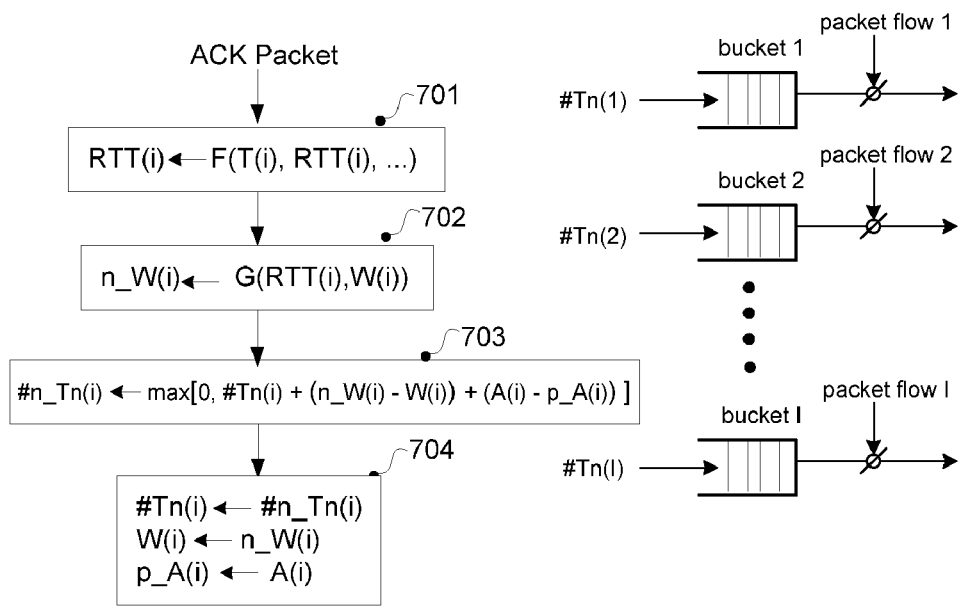
FIG. 7 is a simplified diagram illustrating one embodiment of a window-based flow shaper utilized by the method of the present invention.

Another flow shaper utilized by another embodiment of the present invention is window flow control based on packet RTT estimators and target rates. This flow shaper is illustrated in FIG. 7 with the aid of token buckets. A particularly good location for window flow control shaping is in the end user OSI transport layer module, e.g., in TCP. In such case, each active flow corresponds to a live connection and the user device executes an edge router process without the classification block 440 in FIG. 4. The processing block 440 in FIG. 4 is not required in such a case since each transport layer connection naturally defines a flow and classification is obsolete.

Referring to FIG. 7, the window flow control based on packet RTT estimators practiced by the transport layer at the user device is specified with the aid of unbounded token buckets. Tokens are cleared from the bucket as described above but filled by a mechanism different from the one described above. Instrumental for the window flow control is a built-in mechanism for packet acknowledgment as the one utilized in TCP. That is, all packets sent out by the connection source must be acknowledged by ACK packets sent back from the connection destination node. Each ACK packet contains a field in its header specifying, explicitly or implicitly, the sequence number of the next expected byte. When an ACK packet is received by the source of connection i, the RTT of the corresponding packet is measured and set into variable T(i). When an ACK packet is received by the source of connection i, the updated number of tokens in the bucket is computed by the window flow control shaper based on four variables: (1) The sequence number of the next expected byte received in the recent ACK, A(i); (2) the sequence number of the next expected byte received in the previous ACK, p_A(i); (3) the current window size, W(i), (measured in bytes); and (4) the current packet RTT estimator, RTT(i).

Continuing with the window flow control set forth above, an updated RTT estimator, RTT(i), is computed in step 701 every time an ACK packet is received by the source node of connection i based on the history of RTT measurements and the previous RTT estimator. The estimator is specified by function F, where one exemplary function is specified above. The output of function F is given by $C \times RTT(i)+(1-C) \times T(i)$, where C is a constant between zero and one. Upon an RTT(i) update, the new window size, n_W(i), is updated in step 702 by a function G that utilizes the recent RTT estimator, RTT(i), the required transmission rate, Rate(i), and possibly the recent window size, W(i), and other tuning parameters. An exemplary G function is specified above, where the output of G is given by $CW \times Window\_Size(i)+(1-CW) \times RTT(i) \times Rate(i)$. Here, Rate(i) is the current target transmission rate of flow i provided by another process (e.g., the edge router process) and CW is a constant between zero and one. In another embodiment of the flow control of the present invention, the output of function G is further bounded from below and from above by pre-specified tuning parameters. Next, the new number of tokens in the bucket, #n_Tn(i), is computed in step 703 by $\#n\_Tn(i)=\max[0, \#Tn(i)+(n\_W(i)-W(i))+(A(i)-p\_A(i))]$ Note that in this computation, $A(i)-p\_A(i)$ is the number of new acknowledged bytes, $n\_W(i)-W(i)$ is the difference between the new and the previous window sizes and #Tn(i) is the number of tokens not yet utilized by connection i (i.e., left in the bucket). Since $n\_W(i)-W(i)$ could be negative, bounding #n_Tn(i) below by zero is required. Next, in step 704, the recent number of tokens in the bucket, the current window size and the sequence number of the next expected byte received in the previous ACK are updated by the equations $\#Tn(i)=\#n\_Tn(i); W(i)=n\_W(i);$ and $p\_A(i)=p\_A(i)$, respectively. Having explained the manner by which the number of tokens varies in time, the window flow control shaper operates as a token bucket mechanism. That is, the variable #Tn(i) is reduced as new data packet from flow i arrive at the source node. When a packet comprising n bytes arrives, n tokens (if exist) are removed from bucket i (and subtracted from #Tn(i)) and the packet is sent to the network. If fewer than n tokens are available, no tokens are removed from the bucket, and the packet is considered to be non-conformant. Non-conformant packets can be treated in various ways: they may be dropped; they may be queued for subsequent transmission when sufficient tokens have accumulated in the bucket; and they may be transmitted, but marked as being non-conformant, possibly to be dropped subsequently if the network is overloaded.

Summary of Terminologies

| Definition List 1 | |
| --- | --- |
| Term | Definition |
| A non-degenerated backbone network | A communication backbone network comprising at least one source edge router and one destination edge router connected by at least one core link, where each one of them is connected to end user devices through access links. |

-continued

Definition List 1

| Term | Definition |
| --- | --- |
| Backward RMP packet | A resource management protocol packet returned from a destination edge router process to its source edge router process. |
| Commit Type I-1 RMP packet | A Type I-1 packet associated with a flow that has been admitted to the network. |
| Confidence interval | A line interval surrounding a required performance value whose left edge is smaller than the value and the right edge is larger than the value. |
| Core router process | A computational process executed in each edge and core router or in an external network processor device attached to the core links arriving from the output ports of the edge/core router on one end, and to the core links leading to the next core/edge router. |
| Edge router process | A computational process executed in each edge router or in an external network processor device attached to the access links arriving from user devices on one end, and to the edge router input ports on the other end. |
| Flow | A stream of data packets having the same QoS class traversing through a backbone network from the same source node to the same destination node and along the same route. |
| Flow control | The task of allocating the link bandwidths between the flows and shaping their transmission rates accordingly. |
| Forward RMP packet | A resource management protocol packet transmitted from a source edge router process to a destination edge router process. |
| Normal Type I-1 RMP packet | A Type I-1 packet associated with a flow that has not yet admitted to the network. |
| Round Trip Time (RTT) | The time required for a packet transmitted from a source node to reach its destination node and back. |
| Type I flow | A flow with a minimum transmission rate requirement. |
| Type II flow | A flow without a minimum transmission rate requirement. |
| Type I-1 RMP packet | An RMP packet associated with a flow of Type I wishing to enter the backbone network. |
| Type I-2 RMP packet | An RMP packet associated with a flow of Type I which ceases to be active. |
| Type II RMP packet | An RMP packet associated with either a flow of Type II or with an active flow of Type I. |

What is claimed is:

1. In a non-degenerated backbone network transmitting flows from a plurality of QoS levels that are determined either at the source edge router process or specified in the data packet header, a method in an edge router process for classifying into flows every data packet arriving at the source edge router process from an end user device through its access link, updating the current list of active flows in the source edge router based on flow activities and possibly transmitting Type I-1 and Type I-2 forward RMP packets, the method comprising the steps of:

checking a local interval timer, and
if the timer has expired, terminating the classification and updating process without taking any further steps;
if the timer has not expired,
setting the timer again to a predefined positive value, which can also be extremely large, and continuing the classification and updating with the following steps;
setting a wildcard symbol in the identifier of the output link (denoted by out_port) through which the packet will be switched out by the edge router, and
if the actual output link identifier can be retrieved from the edge router, setting it to the out_port variable; and
scanning a local data structure, which maintains the active flows (denoted by Active_Flow_DS), for determining if the data packet matches an active flow characterized by the packet source IP address header field, or alternatively by a unique representative IP address in the network number of the packet source IP address, and also by the packet destination IP address header field, or alternatively by a unique representative IP address in the network number of the packet destination IP address, and also by the packet TOS header field, and if out_port is retrieved, then also by the out_port value; and comparing between the flow characteristics of each scanned flow in Active_Flow_DS and that of the arriving data packet, and
if the data packet matches an active flow in Active_Flow_DS, the current local time is set to a designated field (denoted by Modified) associated with the matching flow;
if the data packet does not match an active flow in Active_Flow_DS, the flow is checked for staleness by subtracting its Modified value from the current local time, and
if the result is greater than a predefined time period, then removing the flow from Active_Flow_DS; and
if the flow is also of Type I, transmitting a Type I-2 forward RMP packet toward the flow destination using a reliable protocol; and
completing the scanning by
adding a new flow to Active_Flow_DS with the characteristics of the arriving data packet, if no match is found; and
transmitting a normal Type I-1 forward RMP packet toward the flow destination using a reliable protocol, if the flow is of Type I and no match is found.

2. In a non-degenerated backbone network transmitting flows from a plurality of QoS levels that are determined either at the source edge router process or specified in the data packet header, a method in an edge router process for admitting new flows and updating all or any subset of the following variables for each active flow in the source edge router, the variables being the current packet round trip time estimator (denoted by F_RTT), the current packet loss rate estimator (denoted by LOSS_R), the current fair transmission rate of a flow without minimum transmission rate requirement (denoted by F_RATE) and the current window size (denoted by WIN) utilized for window flow control, the method comprising steps of:

generating periodically Type II forward RMP packets for every active flow, each packet includes the flow identification, the QoS and priority levels, the requested minimum rate, the difference between the current and the previous transmission rates, the packet sequence number and a request to revise the link utilization upper bound; and transmitting, and at the same time starting an interval timer, each forward RMP packet toward its destination where it is intercepted by the corresponding destination edge router process and sent back to its originating edge router process as backward RMP packet; and processing every return of a Type II backward RMP packet by updating the estimator F_RTT of the respective flow with $C \times P\_F\_RTT + (1-C) \times RTT$, where P_F_RTT is the previous estimator value, C is a predefined constant between zero and one and RTT is the value of the corresponding interval timer; and by updating the estimator LOSS_R of the respective flow with $CL \times P\_LOSS\_R + (1-CL) \times Losses/(1+Losses)$, where P_LOSS_R is the previous estimator, 1+Losses is the difference between the sequence numbers (denoted by SEQ#) of the currently returned and the previously returned backward RMP packets from the same flow and CL is a predefined constant between zero and one; and by updating the fair transmission rate F_RATE, if the respective flow has no minimum transmission rate requirement, with $(W/FB)^{1/FL}$, where W is the weight associated with the respective flow, FB is the feedback information in the currently returned backward RMP packet and FL is a constant equals to or larger than one specifying the fairness level parameter utilized by the backbone network; and by updating the window size, WIN, utilized for window flow control of the respective flow, with max{mm{CW×P_WIN+(1−CW)×F_RTT× F_RATE; WIN_UB}; WIN_LB}, where F_RTT is the current estimated packet round trip time of the respective flow, F_RATE is the current required transmission rate of the respective flow, P_WIN is the previous window size, CW is a predefined constant between zero and one, and both WIN_UB and WIN_LB are predefined upper and lower bounds on the window size, respectively; and processing every return of a Type I-1 backward RMP packet by admitting the respective flow to the network and transmitting a commit Type I-1 forward RMP packet, if the designated feedback information field of the RMP packet indicates flow admission; and by removing the respective flow from the local active flow list, if the designated feedback information field of the RMP packet indicates flow rejection; and processing every return of a Type I-2 backward RMP packet by disposing it.

3. The method as set forth in claim 2, wherein before transmitting each forward RMP packet for an active flow, further verifying whether or not the end-to-end packet delay and the end-to-end packet loss rate conform to the flow QoS requirements and requesting an appropriate update from the core router processes so as to address the flow QoS requirements, the method further comprising the steps of:

checking the locations of the estimated packet round trip time F_RTT, and the estimated packet loss rate, LOSS_R of the respective flow, relative to two corresponding confidence intervals, one of which is around the pre-specified packet delay requirement and the other of which is around the packet loss rate requirement of the respective flow; and if both, F_RTT and LOSS_R, are within their corresponding confidence intervals, a designated field in the RMP packet (denoted by UTIL_REV) is set to indicate the core router processes that no update of the respective link utilization is required;

if F_RTT or LOSS_R is greater than the right edge of the corresponding confidence interval, then UTIL_REV is set to indicate the core router processes that they should reduce the respective link utilization while computing their feedback information;

if both, F_RTT and LOSS_R, are smaller than the left edge of each corresponding confidence interval, then UTIL_REV is set to indicate the core router processes that they could increase the respective link utilization while computing the feedback information.

4. In a non-degenerated backbone network transmitting flows from a plurality of QoS levels that are determined either at the source edge router process or specified in the data packet header, a method in a core router process for updating upon every forward RMP packet arrival all or any subset of the following variables associated with each output core link (denoted by n) and scheduling priority level (denote by p), the variables being the feedback information contributed by the core router process for link n and priority p (denoted by FB(p,n)), the reserved bandwidth in link n for Type I flows with priority p (denoted by RES(p,n)) and the bandwidth in link n utilized by Type II flows with priority p or with higher priority (denoted by RATE(p,n)), the method comprising steps of:

retrieving, explicitly from the core router, or implicitly from the incoming port, the output link identifier through which the RMP packet will be switched out downward its destination and setting it to variable n; and extracting the priority level from a designated field of the RMP packet and setting it to variable p; and extracting from the local data structure (denoted by Flow_LINK_DS), the capacity of link n, the total reserved rate in link n for flows of Type I, and the upper bound on the utilization of link n set for packets with the same scheduling priority asp or with higher priority, and setting them to variables c, r and u, respectively; and checking the type of the forward RMP packet; and if the RMP packet is a normal Type I-1 and the requested minimum transmission rate is less than c×u−r, then a logical AND between one and the designated feedback information field in the RMP packet is set into the latter indicating that link n can accommodate the new flow; and the reserved rate in link n for flows of Type I having priority level p in Flow_LINK_DS, RES(p,n), is conditionally incremented by the requested rate of the respective new flow taken from a designated field of the RMP packet;

if the RMP packet is a normal Type I-1 and the requested minimum transmission rate is not less than c×u−r, then a logical AND between zero and the designated feedback information field of the RMP packet is set into the latter indicating that link n cannot accommodate the new flow if the RMP packet is a commit Type I-1, then the respective reservation is committed;

if the RMP packet is of Type I-2, then the reserved rate in link n for flows of Type I having priority level p in Flow_LINK_DS, RES(p,n), is decremented by the rate reserved for the respective non-active flow taken from a designated field of the RMP packet;

if the RMP packet is of Type II and also associated with a flow of Type II, then the variable RATE(p,n) in the local Flow_LINK_DS data structure is updated with the rate difference taken from a designated field of the RMP packet; and the contribution to the feedback information for link n and priority p is computed by pos {P_FB(p,n)+C×(Rate(p,n)−f((c−r)xu))}, where P_FB(p,n) is the feedback information computed in the previous update of the variables associated with output link n and priority p, C is a predefined positive tuning constant, Rate (p,n) is the sum of all current packet transmission rates associated with flows having priority level p or higher priority and are traversing through output link n as retrieved from the local Flow_LINK_DS data structure, f(rc) could be any quantized implementation of a continuous and strictly increasing non-negative function of rc satisfying f(0)=0, pos{x} is the non-negative part of the variable x and rc is given by (c−r)xu; and the computed feedback information contribution is added to the designated feedback information field of the RMP packet and also updates the local Flow_LINK_DS data structure.

5. The method as set forth in claim 4, wherein, before extracting from Flow_LINK_DS the data required for the setting of the variables c, r and U, in the case of forward RMP packets of Type II, further updating the utilization upper bound on each link n and priority p (denoted by bw_util(p,n)), the method further comprising the steps of:

checking a local interval timer, and if the timer has been expired, the updating aborts and no further steps are taken;

if the timer has not been expired, the timer is set again to a predefined positive value which can also be extremely large, and the updating proceeds with the following steps; and checking the value of a designated field in the forward RMP packet (denoted by UTIL_REV) carrying the update request, and if UTIL_REV equals one, then bw_util(p,n) is decremented by a predefined positive constant while preserving consistency between all variables bw_util(1, n), bw_util(2,n), . . . , bw_util(P,n), where P is the number of supported priority levels;

if UTIL_REV is negative, then bw_util(p,n) is incremented by a predefined positive constant while preserving consistency between all variables bw_util(1, n), bw_util(2,n), . . . , bw_util(P,n), where P is the number of supported priority levels;

if UTIL_REV equals zero, then no variables are updated.

6. In a non-degenerated backbone network transmitting flows from a plurality of QoS levels that are determined either at the source edge router process or specified in the data packet header, a method for admitting new flows of Type I and computing the transmission rate of every flow of Type II so as to meet the QoS requirements of all active flows and at the same time achieving fair allocation of rate, comprising the steps of:

classifying the data packets arriving to each source edge router process from the end user devices through their access links into flows; and determining the active flows in each source edge router process based on each flow activity; and generating a normal Type I-1 forward RMP packet for each new flow of Type I; and generating a commit Type I-1 forward RMP packet for each new flow of Type I that has been admitted to the network; and generating a Type I-2 forward RMP packet for each flow of Type I that ceases to be active; and generating periodically Type II forward RMP packets for each active flow in every source edge router process, each packet includes the flow identification, the QoS and priority levels, the requested minimum rate, the difference between the current and the previous transmission rates, the packet sequence number, the feedback information, and a request to revise the link utilization upper bound; and estimating the RTT and the packet loss rate of each active flow in every source edge router process based on RMP packets and checking if both satisfy the QoS requirements of the corresponding flow; and setting the request to revise the link utilization upper bound in a designated field of the forward RMP packet in accordance to the QoS requirement check; and transmitting each Type II forward RMP packet to its corresponding destination edge router process and starting an interval timer for RTT timing; and intercepting forward RMP packets in each destination edge router process and sending them back as backward RMP packets to their corresponding source edge router processes; and intercepting backward RMP packets in each source edge router process, and based on the information fields carried by each backward RMP packet, computing the updated transmission rate of the corresponding flow, if the backward RMP packet is of Type II; and deciding whether or not to admit the corresponding flow into the network, if the backward RMP packet is of Type I-I; and reading and processing in every core router process each forward RMP packet traversed through it, and based on the information fields it carries, updating the feedback information in its fields; and updating in the local data structure the reserved rates of Type I flows, the transmission rates of Type II flows, and the upper bounds on the link utilizations; and forwarding the forward RMP packet toward its destination.

7. In a non-degenerated backbone network transmitting flows from a plurality of QoS levels that are determined either at the source edge muter process or specified in the data packet header, a method for shaping the transmission rate of each active flow in every source edge router process and in every transport layer application in the end user device so as to meet the flow target rate (denoted by F RATE) by utilizing the RTT-based window flow control wherein the current window size, WIN, is established, the method comprising steps of:

generating periodically Type II forward RMP packets for every active flow, each packet includes the flow identification, the QoS and priority levels, the requested minimum rate, the difference between the current and the previous transmission rates, the packet sequence number and a request to revise the link utilization upper bound; and transmitting, and at the same time starting an interval timer, each forward RMP packet toward its destination where it is intercepted by the corresponding destination edge router process and sent back to its originating edge router process as a backward RMP packet; and processing every return of a Type II backward RMP packet by updating the current packet round trio time estimator, F_RTT, of the respective flow with $C \times P\_F\_RTT+(1-C) \times RTT$, where P_F_RTT is the previous estimator value, C is a predefined constant between zero and one and RTT is the value of the corresponding interval timer; and by updating the current packet loss rate estimator, LOSS_R, of the respective flow with $CL \times P\_LOSS\ R+(1-CL) \times Losses/(1+Losses)$, where P_LOSS_R is the previous estimator, 1+Losses is the difference between the sequence numbers (denoted by SEQ#) of the currently returned and the previously returned backward RMP packets from the same flow and CL is a predefined constant between zero and one; and by updating the flow fair target transmission rate F_RATE, if the respective flow has no minimum transmission rate requirement, with $(W/FB)^{1/FL}$, where W is the weight associated with the respective flow, FB is the feedback information in the currently returned backward RMP packet and FL is a constant is larger than zero specifying the fairness level parameter utilized by the backbone network; and by updating the current window size, WIN, utilized for the RTT-based window flow control of the respective flow, with $\max\{\min\{CW \times P\_WIN+(1-CW) \times F\_RTT \times F\_RATE;\ WIN\_UB\};\ WIN\_LB\}$, where F_RTT is the current estimated packet round trip time of the respective flow, F_RATE is the current required target transmission rate of the respective flow, P_WIN is the previous window size, CW is a predefined constant between zero and one, and both, WIN_UB and WIN_LB, are predefined upper and lower bounds on the window size, respectively; and processing every return of a Type I-1 backward RMP packet by admitting the respective flow to the network and transmitting a commit Type I-1 forward RMP packet, if the designated feedback information field of the RMP packet indicates flow admission; and by removing the respective flow from the local active flow list, if the designated feedback information field of the RMP packet indicates flow rejection; and processing every return of a Type I-2 backward RMP packet by disposing it.

* * * * *